US011835031B2

(12) United States Patent
Hench

(10) Patent No.: US 11,835,031 B2
(45) Date of Patent: Dec. 5, 2023

(54) MASTLESS WIND TURBINE WITH STATIONARY SAILS FOR IMPROVED POWER GENERATION

(71) Applicant: Steven C. Hench, Dallas, TX (US)

(72) Inventor: Steven C. Hench, Dallas, TX (US)

(73) Assignee: J. Hench Consulting, Inc., Benbrook, TX (US)

( * ) Notice: Subject to any disclaimer, the term of this patent is extended or adjusted under 35 U.S.C. 154(b) by 0 days.

(21) Appl. No.: 17/826,206

(22) Filed: May 27, 2022

(65) Prior Publication Data

US 2022/0290649 A1 Sep. 15, 2022

Related U.S. Application Data

(63) Continuation-in-part of application No. 17/321,271, filed on May 14, 2021, now Pat. No. 11,668,278, (Continued)

(51) Int. Cl.
*F03D 3/00* (2006.01)
*F03D 3/06* (2006.01)
(Continued)

(52) U.S. Cl.
CPC ............ *F03D 3/005* (2013.01); *F03D 3/062* (2013.01); *F03D 3/064* (2013.01); *F03D 9/11* (2016.05);
(Continued)

(58) Field of Classification Search
CPC . F03D 3/005; F03D 3/06; F03D 3/062; F03D 3/064; F03D 9/25; F05B 2240/211; F05B 2240/311
(Continued)

(56) References Cited

U.S. PATENT DOCUMENTS 4,708,592 A 11/1987 Krolick et al.
2010/0278629 A1 11/2010 Krippene
(Continued)

FOREIGN PATENT DOCUMENTS

WO WO-2011011018 A1 1/2011
WO WO-2014195640 A1 12/2014

OTHER PUBLICATIONS

European Patent Office, Extended European Seach Report issued for European Patent Application No. 17876489.0, dated Aug. 18, 2020, 7 pages.

*Primary Examiner* — David E Sosnowski
*Assistant Examiner* — Maxime M Adjagbe
(74) *Attorney, Agent, or Firm* — Norton Rose Fulbright US LLP

(57) ABSTRACT

Aspects of the disclosure disclose a turbine that includes multiple rotating sails and multiple stationary sails. A mastless vertical axis wind turbine includes a first plurality of sails that are configured to rotate about a vertical axis under the influence of wind. A platform is coupled to the first plurality of sails. During operation of the mastless vertical axis wind turbine, the platform is in tension with the first plurality of sails at one or more points about a particular end of the first plurality of the sails. The mastless vertical axis wind turbine also includes a second plurality of sails having respective first ends that are coupled together and second ends that are each coupled to one or more stationary surfaces. The second plurality of sails are configured to remain stationary as the first plurality of sails rotate under the influence of the wind.

26 Claims, 15 Drawing Sheets

Related U.S. Application Data which is a continuation of application No. 15/901,701, filed on Feb. 21, 2018, now Pat. No. 11,009,004, which is a continuation of application No. 15/368,303, filed on Dec. 2, 2016, now Pat. No. 9,995,275.

(60) Provisional application No. 62/237,076, filed on Oct. 5, 2015.

(51) Int. Cl.
*F03D 9/11* (2016.01)
*F03D 9/25* (2016.01)

(52) U.S. Cl.
CPC ............ *F03D 9/25* (2016.05); *F05B 2210/16* (2013.01); *F05B 2240/211* (2013.01); *F05B 2240/311* (2013.01); *Y02B 10/30* (2013.01); *Y02E 10/74* (2013.01)

(58) Field of Classification Search
USPC ..... 416/132 A, 132 B; 415/4.1, 4.2, 4.3, 4.4, 415/4.5
See application file for complete search history.

(56) References Cited

U.S. PATENT DOCUMENTS

| | | |
|---|---|---|
| 2011/0006540 A1 | 1/2011 | Ignatiev et al. |
| 2012/0068465 A1 | 3/2012 | Dawoud et al. |
| 2013/0106193 A1 | 5/2013 | Bryson |
| 2013/0115086 A1 | 5/2013 | Hench |
| 2014/0227094 A1 | 8/2014 | Xia |
| 2015/0110598 A1 | 4/2015 | Lee et al. |

700

702 — Engage a mastless vertical axis wind turbine with a first stationary support and a second stationary support, where the mastless vertical axis wind turbine includes: a first plurality of sails that rotate about a vertical axis under the influence of wind; a platform configured to couple the first plurality of sails to the first stationary support, the platform configured to, during operation of the mastless vertical axis wind turbine, be in tension with the first plurality of sails at one or more points about a first end of the first plurality of sails and to rotate with the first plurality of sails under the influence of the wind while the first stationary support remains stationary; and a central connector configured to couple the first plurality of sails to the second stationary support, the central connector configured to, during operation of the mastless vertical axis wind turbine, be in tension with the first plurality of sails about the vertical axis and a second end of the first plurality of sails 704 — Engage a second plurality of sails to the central connector of the mastless vertical axis wind turbine, the second plurality of sails having respective first ends that are coupled together and second ends that are each coupled to one or more stationary surfaces, the second plurality of sails configured to, during operation of the mastless vertical axis wind turbine, remain stationary while the first plurality of sails rotate under the influence of the wind

FIG. 7

MASTLESS WIND TURBINE WITH STATIONARY SAILS FOR IMPROVED POWER GENERATION

CROSS-REFERENCE TO RELATED APPLICATIONS

This application is a continuation-in-part of U.S. patent application Ser. No. 17/321,271 filed May 14, 2021 and entitled "MASTLESS WIND TURBINE FOR POWER GENERATION"; which is a continuation of U.S. patent application Ser. No. 15/901,701 filed Feb. 21, 2018, that issued as U.S. Pat. No. 11,009,004 on May 18, 2021, and entitled "MASTLESS WIND TURBINE FOR POWER GENERATION"; which is a continuation of U.S. patent application Ser. No. 15/368,303 filed Dec. 2, 2016, that issued as U.S. Pat. No. 9,995,275 on Jun. 12, 2018, and entitled "MASTLESS WIND TURBINE FOR POWER GENERATION"; which claims the benefit of U.S. Provisional Patent Application No. 62/237,076 filed Oct. 5, 2015, and entitled, "WIND TURBINES AND OTHER TURBINES FOR POWER GENERATION", the disclosures of which are hereby incorporated herein by reference in their entirety.

TECHNICAL FIELD

The present application is generally related to wind turbines. In particular, but not by way of limitation, the present application is related to mastless wind turbines having sails that rotate under the influence of wind and sails that do not rotate while the other sails rotate under the influence of the wind.

BACKGROUND

Commonly used wind turbines, particularly those that rotate about a vertical axis, are mechanically inefficient, cumbersome, and relatively expensive. A contributing factor to these difficulties is the fact that known wind turbines that rotate about a vertical axis rely upon a central mast extending upward from the bottom of the turbine to anchor rotating vanes. During operation, the central mast rotates with vanes to which it is attached. Including such a mast not only increases cost and weight of required material, but also induces mechanical problems. Torsional forces between the vanes, the mast, and bottom surface give rise to mechanical inefficiencies and breakdown. As such, known wind turbines of these types are difficult to deploy and maintain energy output, particularly under varying wind conditions.

Further, known vertical axis wind turbines utilize blades and/or wheels that can be heavy, unsightly, dangerous to wildlife, and difficult to transport. Rotation of the heavy blades and/or wheels can cause damage to surrounding objects, such as animals, as well as the blades and/or wheels themselves.

To increase the energy output of turbines, multistage horizontal turbines have been developed. These multistage turbines, such as those used in jet engines, include stages of rotors alternated with stages of stators. The stators are positioned and configured to direct the airflow in a desired direction. Although energy output of multistage turbines is higher than single stage turbines, the multistage turbines include significant extra costs for materials and increase the weight of the turbines, which makes the turbines less suitable for deployment for capturing wind energy. The increased costs and complexity of these designs do not improve the energy output enough to justify the deployment from a cost perspective. For example, the addition of a part or feature may be evaluated in terms of the contribution to the return on investment of original machine. In the case of a wind turbine, an addition of multiple stages or other features may be economically efficient if the improvement increases the output power of the turbine by a factor that is greater than the increased cost factor of making the addition. To illustrate, adding multiple stages to a turbine that increase cost by 20% may not be economically feasible if the output power is only increased by 10%.

BRIEF SUMMARY

In various aspects, a turbine may be utilized to generate energy. The turbine can include a frame, base, and sails. One or more sails can be coupled at an end to the base. One or more of the sails can be coupled to a frame. As the sails rotate, power can be generated. Implementations can include one or more of the following features: the frame can be external. The frame can be shaped approximately as a triangular pyramid. The turbine can include six (6) sails. The base can include an open frame with a hexagonal hub and 6 spokes.

According to certain aspects, a mastless turbine comprises a plurality of sails that rotate about a vertical axis under the influence of wind. The turbine also comprises a bottom platform configured to couple the plurality of sails to a first stationary support. During operation of the mastless vertical axis wind turbine, the bottom platform connects to and is in tension with the plurality of sails at one or more points about the bottom of the plurality of the sails and rotates with the plurality of sails under the influence of wind. The turbine further comprises a connector that is configured to couple the plurality of sails to a second stationary support. During operation of the mastless vertical axis wind turbine, the connector connects to and is in tension with the plurality of sails about the axis of rotation and the top of the plurality of the sails. The central connector itself comprises a top portion configured to attach to the second stationary support that during operation of the mastless vertical axis wind turbine does not rotate. The central connector also comprises a bottom portion configured to attach to the plurality of the sails that during operation of the mastless vertical axis wind turbine rotates with respect to the top portion with the plurality of sails under the influence of wind.

In some implementations, the turbine may be configured with one or more stationary sails (e.g., stators) to at least partially re-direct airflow to the rotating sails of the turbine, thereby improving energy output of the turbine. To illustrate, a mastless vertical axis wind turbine may include a platform and at least two types of sails: moving (e.g., rotating) sails and stationary sails (e.g., stators). For example, a first plurality of sails may be coupled to the platform and configured to rotate about a vertical axis under the influence of wind. During operation of the mastless vertical axis wind turbine, the platform may be configured to be in tension with the first plurality of sails at one or more points about a particular end (e.g., the bottom) of the first plurality of the sails. The mastless vertical axis wind turbine may be coupled to a battery that is configured to store power generated by the rotation of the first plurality of sails, or the turbine may act as a power source for one or more other components. A second plurality of sails that are disposed outside a sweeping range of the first plurality of sails may be coupled together at respective first ends (e.g., the top) above the first plurality of sails on the vertical axis. The second plurality of sails may have second ends (e.g., the bottoms) that are each coupled to one or more stationary surfaces, such as the ground, a base, or the like. The second plurality of sails may be configured to remain stationary as the first plurality of sails rotate under the influence of the wind during operation of the mastless vertical axis wind turbine. By appropriate positioning and configuration of the second plurality of sails, airflow that would otherwise flow away from the first plurality of sails may be redirected to the first plurality of sails, which may increase swept area of the rotating sails, increase positive drive pressure on downwind rotating sails, and decrease parasitic drag pressure on upwind rotating sails. These effects may increase energy production of the mastless vertical axis wind turbine by more than 20%, in some implementations, as compared to a vertical axis turbine without the stationary sails.

According to one aspect, a mastless vertical axis wind turbine is described. The mastless vertical axis wind turbine includes a first plurality of sails configured to, during operation of the mastless vertical axis wind turbine, rotate about a vertical axis under the influence of wind. The mastless vertical axis wind turbine also includes a platform coupled to the first plurality of sails and configured to, during operation of the mastless vertical axis wind turbine, be in tension with the first plurality of sails at one or more points about a particular end of the first plurality of sails. The mastless vertical axis wind turbine further includes a second plurality of sails having respective first ends that are coupled together and second ends that are each coupled to one or more stationary surfaces. The second plurality of sails are configured to remain stationary as the first plurality of sails rotate under the influence of the wind.

According to another aspect, a method for generating energy with a mastless vertical axis wind turbine is described. The method includes configuring a first plurality of sails that during operation of the mastless vertical axis wind turbine rotate about a vertical axis under the influence of wind. The method also includes supporting the first plurality of sails utilizing a platform that during operation of the mastless vertical axis wind turbine is connected to and in tension with the first plurality of sails at one or more points about a particular end of first the plurality of the sails. The method further includes configuring a second plurality of sails that during operation of the mastless vertical axis wind turbine remain stationary as the first plurality of sails rotate under the influence of the wind. The second plurality of sails have respective first ends that are coupled together and second ends that are each coupled to one or more stationary surfaces.

According to another aspect, a mastless vertical axis wind turbine is described. The mastless vertical axis wind turbine includes a first plurality of sails configured to, during operation of the mastless vertical axis wind turbine, rotate about a vertical axis under the influence of wind. The mastless vertical axis wind turbine also includes a platform configured to couple the first plurality of sails to a first stationary support. The platform is configured to, during operation of the mastless vertical axis wind turbine, be in tension with the first plurality of sails at one or more points about a first end of the first plurality of sails and to rotate with the first plurality of sails under the influence of the wind. The first stationary support is configured to remain stationary as the first plurality of sails rotate under the influence of the wind. The mastless vertical axis wind turbine includes a second plurality of sails having respective first ends that are coupled together and second ends that are each coupled to one or more stationary surfaces. The second plurality of sails are configured to remain stationary while the first plurality of sails rotate under the influence of the wind. The mastless vertical axis wind turbine further includes a central connector configured to couple the first plurality of sails and the second plurality of sails to a second stationary support. The central connector is configured to, during operation of the mastless vertical axis wind turbine, be in tension with the first plurality of sails about the vertical axis and a second end of the first plurality of sails.

According to another aspect, a method for generating energy with a mastless vertical axis wind turbine is described. The method includes engaging the mastless vertical axis wind turbine with a first stationary support and a second stationary support. The mastless vertical axis wind turbine includes a first plurality of sails that rotate about a vertical axis under the influence of wind. The mastless vertical axis wind turbine also includes a platform configured to couple the first plurality of sails to the first stationary support. The platform is configured to, during operation of the mastless vertical axis wind turbine, be in tension with the first plurality of sails at one or more points about a first end of the first plurality of sails and to rotate with the first plurality of sails under the influence of the wind while the first stationary support remains stationary. The mastless vertical axis wind turbine further includes a central connector configured to couple the first plurality of sails to the second stationary support. The central connector is configured to, during operation of the mastless vertical axis wind turbine, be in tension with the first plurality of sails about the vertical axis and a second end of the first plurality of sails. The method further includes engaging a second plurality of sails to the central connector of the mastless vertical axis wind turbine. The second plurality of sails have respective first ends that are coupled together and second ends that are each coupled to one or more stationary surfaces. The second plurality of sails are configured to, during operation of the mastless vertical axis wind turbine, remain stationary while the first plurality of sails rotate under the influence of the wind.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying figures, in which:

FIG. 7 illustrates a flow chart of another example of a method for generating energy using a mastless vertical axis wind turbine according to one or more aspects.

Figure 1A:
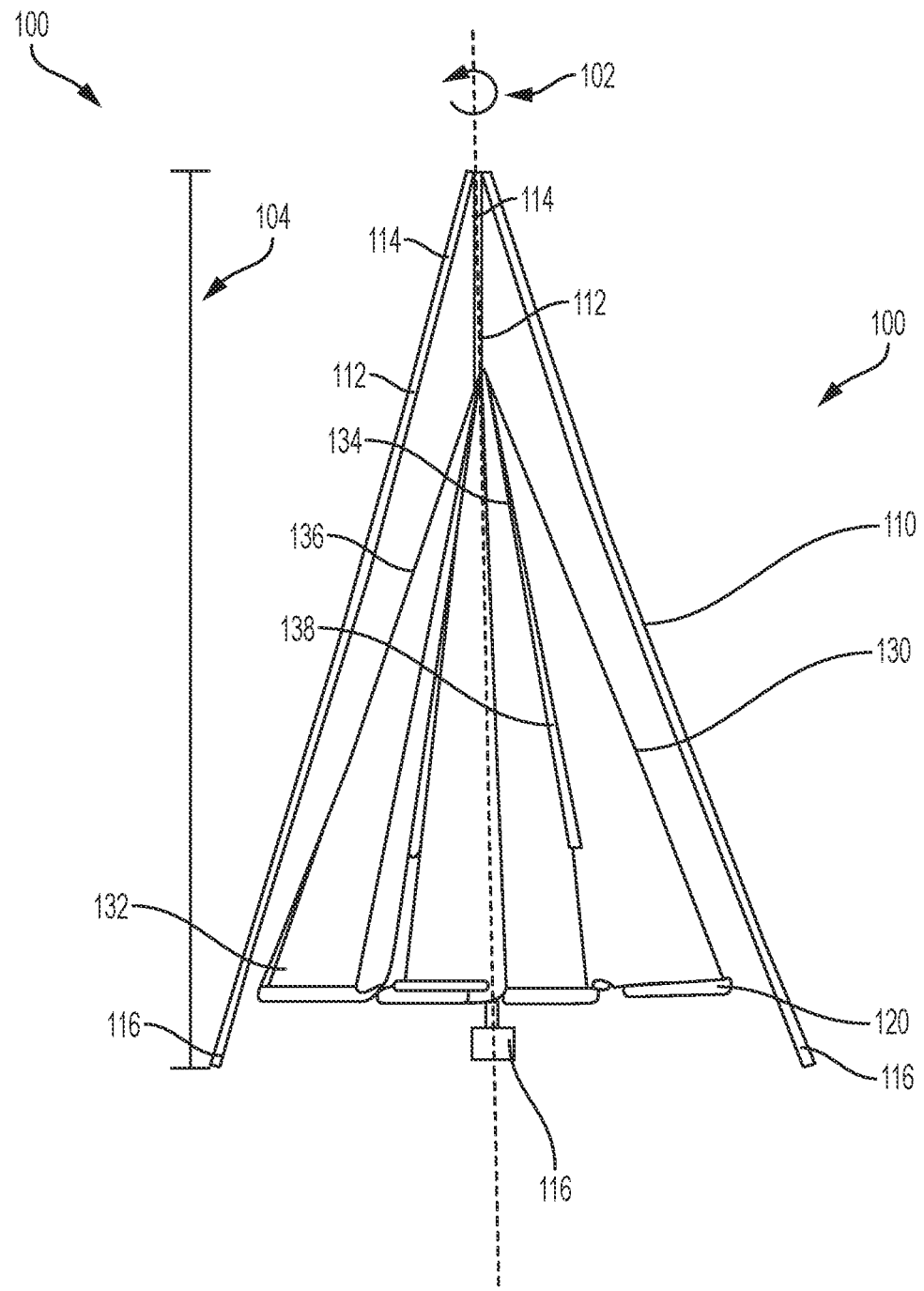
FIG. 1A illustrates an example of a wind turbine according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present application disclose a wind turbine that rotates about a vertical axis to generate energy under the influence of wind. The vanes or sails of the turbine are placed under tension by attaching the bottom of each vane to a platform and the top of each vane to a structure or top tension point positioned about the center of the axis of rotation. The top tension point can comprise an external structure that is supported around the turbine, or may comprise a top attachment point. The latter is advantageous where, e.g., the turbine is reversibly installed at various locations where an external support cannot be placed about the turbine. In either case, as a result, the need for a central mast is obviated.

In operation, the vanes converge toward the top of the turbine, i.e., where each vane connects to the central structure or tension point at their top edge. The configuration of the vanes can be changed by adjusting the position at which the vanes attach to the platform at their bottom edge and the central top tension point.

As the turbine rotates, kinetic energy is generated and then converted to electrical energy (e.g., via a generator), which can be utilized to drive machines (e.g., pumps, air compressors, motors, etc.) and/or can be stored (e.g., in batteries, hydrogen (or other chemical form), high-pressure steam (or other physical form), and/or as compressed air, and the like). A turbine can be part of a turbine array and used in conjunction with an energy storage unit. To that end, an energy storage unit can be utilized in conjunction with one or more turbines in the array and used to efficiently distribute energy to local or remote locations.

Importantly, the energy storage unit can be utilized in conjunction with the one or more turbines to produce a constant or near constant energy output over time and under varying conditions. That is, during operation, all or a portion of the energy generated by the one or more turbines can be distributed to the energy storage unit. During periods of low wind speed, and likewise, low turbine power output, the energy storage unit can be used to increase overall energy output to compensate for a decrease in turbine energy output. During periods of high wind speed, and likewise, high turbine power output, the energy storage unit can be used to buffer or accumulate energy to be provided during periods of low wind speed, thereby enabling the turbine to be used to provide power, regardless of wind speed, without requiring additional dispatchable energy sources.

In some implementations, a turbine described herein is configured with one or more stationary sails (e.g., stators) to at least partially re-direct airflow to rotating sails of the turbine. To illustrate, a mastless vertical axis wind turbine may include a platform and at least two types of sails: moving (e.g., rotating) sails and stationary sails (e.g., stators). The first sails (e.g., the rotating sails) may be coupled to the platform and configured to rotate about a vertical axis under the influence of wind. The second sails (e.g., the stationary sails) may be disposed outside a sweeping range of the first sails and may be coupled together above the first sails on the vertical axis. The second sails may be configured to remain stationary as the first sails rotate under the influence of the wind during operation of the mastless vertical axis wind turbine, which may redirect airflow that would otherwise flow away from the first sails and thus increase swept area of the rotating sails (e.g., the first sails), increase positive drive pressure on downwind rotating sails, and decrease parasitic drag pressure on upwind rotating sails, as further described herein.

In view of the foregoing, described aspects provide a mastless vertical axis wind turbine that comprises a plurality of sails that rotate about a vertical axis under the influence of wind. A platform is connected to and in tension with the plurality of sails at one or more points about the bottom of the plurality of the sails. Also, an external frame is connected to and in tension with the plurality of sails at one or more points about the top of the plurality of the sails. The external frame itself comprises a plurality of legs that converge above the plurality of sails at a central point about the vertical axis of rotation and extend beyond the path swept by the plurality of sails. Also, a coupling mechanism connects one or more of the plurality of legs to the plurality of sails and is configured allow the plurality of sails to rotate about the vertical axis of rotation while the plurality of legs remain stationary.

In some implementations, a generator is in communication with the platform that generates energy in response to rotation of the platform. In some implementations, the generator is centrally aligned with the vertical axis of rotation and can be in communication with one or more energy storage units. To regulate energy output of the turbine over time as discussed above, a controller can operate to cause the energy storage units to increase energy output in response to a decrease in generator energy output and decrease energy output in response to an increase in generator energy output. Although referred to as a generator, in other aspects the turbine can be configured to communicate with various types of energy storage devices, such as generators, alternators, batteries or storage cells, or the like, some of which may include downstream electrical circuitry for converting between alternating and direct current.

In some other implementations, a mastless vertical axis wind turbine includes a first plurality of sails that are configured to rotate about a vertical axis under the influence of wind. A platform is coupled to the first plurality of sails. During operation of the mastless vertical axis wind turbine, the platform is in tension with the first plurality of sails at one or more points about a particular end of the first plurality of the sails. The mastless vertical axis wind turbine also includes a second plurality of sails having respective first ends that are coupled together and second ends that are each coupled to one or more stationary surfaces. The second plurality of sails are configured to remain stationary as the first plurality of sails rotate under the influence of the wind.

Figure 1B:
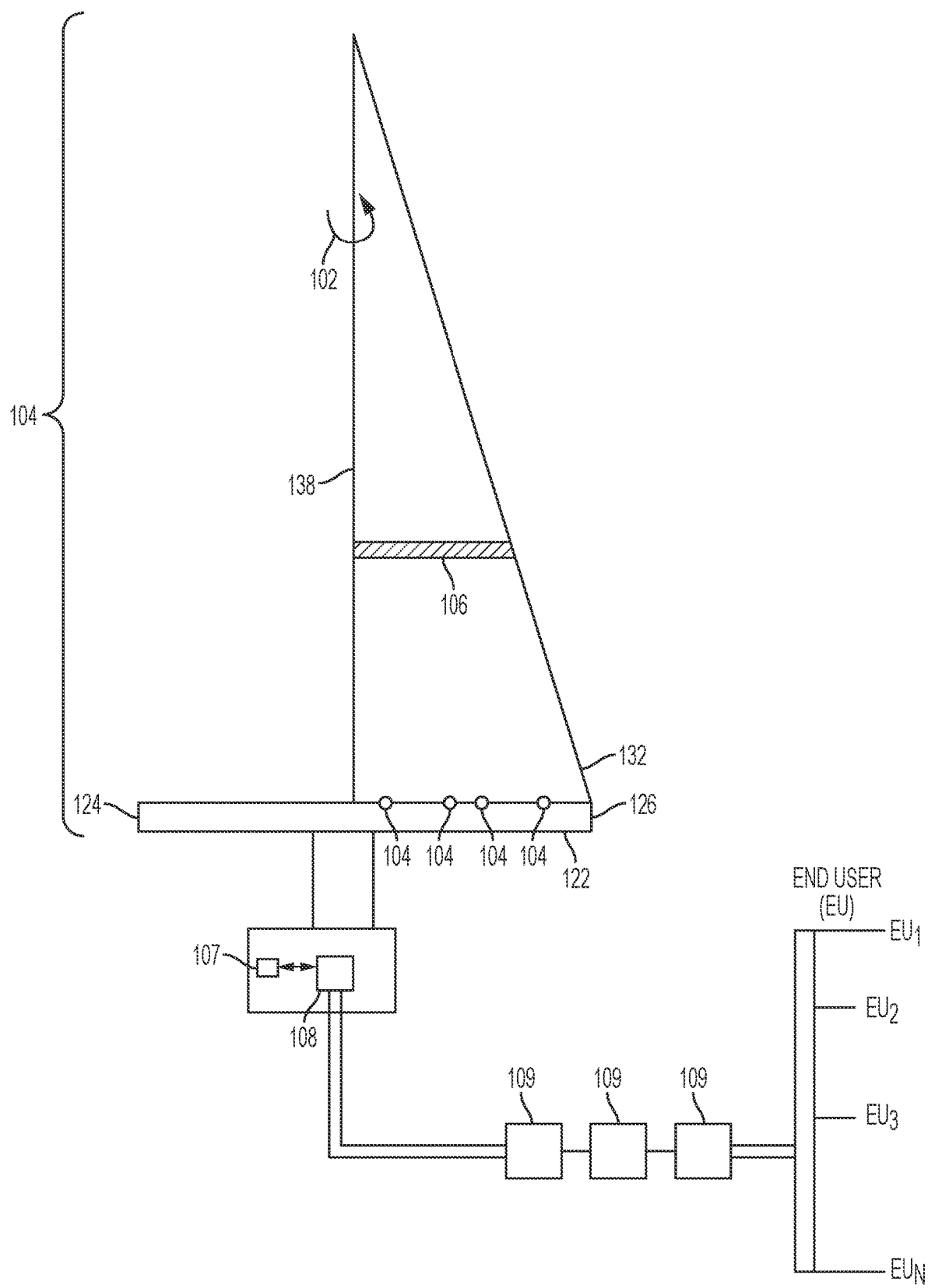
FIG. 1B illustrates a cross section portion of a wind turbine in communication with an energy regulation mechanism according to one or more aspects.
Figure 1C:
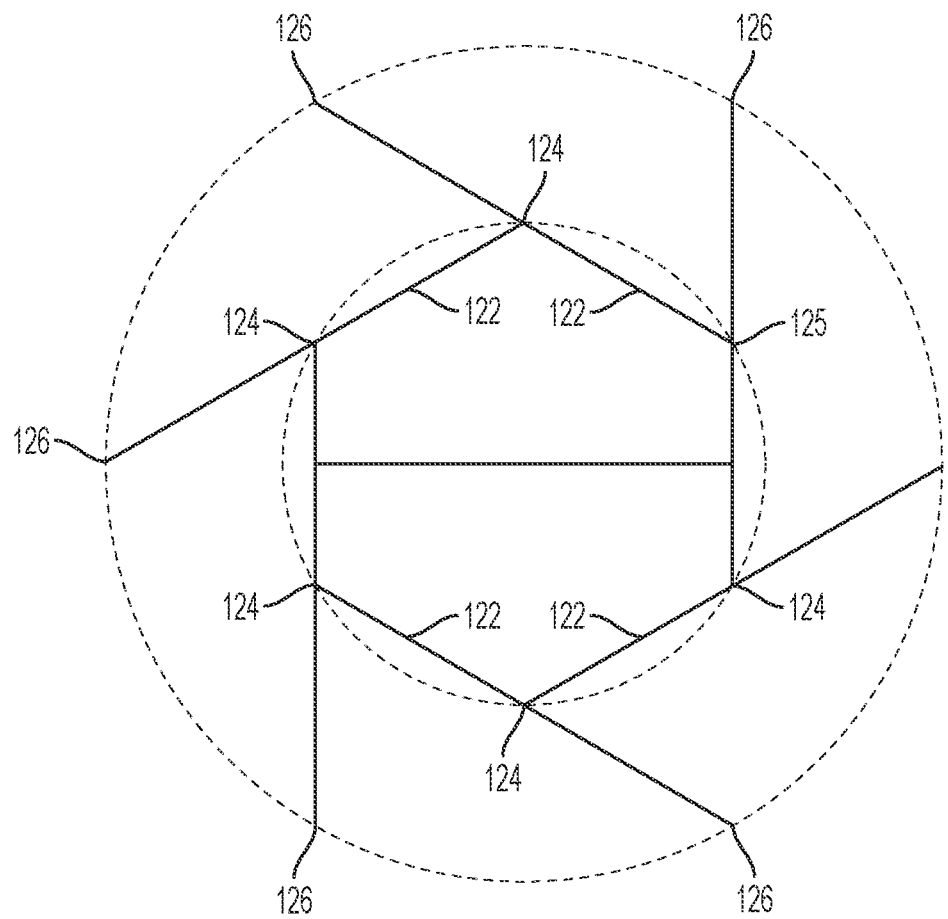
FIG. 1C illustrates a platform of a wind turbine according to one or more aspects.

FIG. 1A illustrates an example of turbine 100 according to one or more aspects, FIG. 1B illustrates a cross section of a first portion of turbine 100 illustrated in FIG. 1A, and FIG. 1C illustrates a platform or second portion of turbine 100 illustrated in FIG. 1A. Turbine 100 can be used to generate energy (e.g., mechanical and/or electrical) from air flow. For example, turbine 100 can be positioned in an area and subject to air flow (e.g., high wind speed and low wind speed).

Turbine 100 includes frame 110, rotating platform or base 120, and a plurality of vanes or sails 130. According to the illustrated embodiment, frame 110 is an external frame (e.g., external to sails 130) and operates to support and place tension on sails 130 in an upward direction. By placing sails 130 under sufficient tension using frame 110, (1) sails 130 efficiently rotate in response to wind, and (2) the need for a central mast attaching to sails 130 is eliminated. Also, as mentioned, according to another embodiment, tension may be placed on sails 130 by attaching each to a central point of tension that does not further comprise an external frame. In such embodiments, sails 130 can connect to a central hook or the like where the hook is free to rotate at one end while it is held stationary at another end. This may be effectuate through the use of bearings or the like, and is advantageous where turbine 100 is installed in compact locations where an external frame would not fit.

Frame 110 can include any appropriate material to provide the appropriate strength to turbine 100. Frame 110 can at least partially support sails 130 and/or base 120, and can be self-erecting and/or manually erected (e.g., by a person).

In some embodiments, frame 110 includes at least three legs 112. Legs 112 each have top end 114 and opposing bottom end 116 and legs 112 can be positioned such that top ends 114 are disposed proximate each other while bottom ends 116 are spaced from one another about the circumference of the circle swept out by sails 130 and/or base 120. Therefore, the ends of legs 112 are uncoupled at or about a bottom portion of frame 110, and coupled (e.g., directly or indirectly) at or about a top end of frame 110. For example, frame 110 can have three legs 112 in a shape arranged as a triangular pyramid, where top end 114 of each leg 112 converges near the axis of rotation of sails 130 while bottom ends 116 of each leg 112 are spaced from one another about the circumference of the circle swept out by sails 130 and/or base 120.

In some embodiments, the ratio of a height of frame 110 to a width of frame 110 can be between approximately from 1-to-1 to 2-to-1, while in a preferred embodiment the ratio of the height of frame 110 to the width of frame 110 is approximately 1.3 to approximately 1. However, it should be appreciated that frame 110 can be any height, even much greater than that of rotating turbine 100 itself. An example might be to increase the ground clearance of turbine 100 for any number of reasons.

Further, the size of frame 110 can be selected to allow sails 130 to rotate within frame 110 without contacting legs 112. The ratio of the height of frame 110 to the width of frame 110 can be approximately the same as the ratio of the height of sail 130 to the width of sail 130, and the overall height of frame 110 can be larger than the overall height of sail 130.

Platform or base 120 can include any appropriate material, such as metal, fiber reinforced plastics, and/or wood. Preferably, to reduce weight of turbine 100, base 120 can comprise an open frame (e.g., at least approximately 50% of the footprint of base 120 is open and/or components of base 120 comprise an area of less than approximately 50% of the footprint of base 120).

Sails 130 can rotate in the presence of a fluid flow (e.g., wind) about a central axis of rotation 102 to generate energy. Sails 130 can have a shape that is wider at bottom end 132 than at top end 134 where, e.g., sails 130 can be approximately triangularly-shaped or approximately trapezoidally-shaped. When sails 130 are positioned in turbine 100, exterior side 136 of sails 130 can form an approximately conical shape and/or at least a portion of a conical shape. In some embodiments, the ratio of a height of a sail 130 to a width of a sail 130 can be approximately 2-to-1. In a preferred embodiment, the ratio of the height of turbine 100 to the width of turbine 100 can be approximately 1.3 to approximately 1.

Turbine 100 can include an even or odd number of sails 130, where each may be formed of any appropriate material. In some embodiments, sails 130 can include a material that allows each sail 130 to collapse, be rolled, and/or otherwise reduced in size for storage, transport, and/or other appropriate reasons (e.g., winds exceeding a predetermined maximum velocity).

Referring to FIG. 1A and FIG. 1B, each sail 130 has bottom end 132 and top end 134. At least a portion of bottom end 132 can be coupled to base 120 at attachment points 104. Bottom end 132 can extend along a length of base 120. In some embodiments, the width of sail 130 can be approximately the same as the length of base 120. At least a portion of top end 134 can be coupled directly or indirectly to frame 110 or another top tension point.

For example, sails 130 can be coupled together and/or coupled to a connector (not shown) that couples to frame 110 (e.g., a top portion of frame 110 where legs 112 are coupled). A gap can be disposed between top ends 134 of sails 130 and bottom ends 132 of legs 112. This gap can facilitate rotation of sails 130 and/or connection of sails 130 to frame 110. Bottom ends 132 of each sail 130 of turbine 100 can be proximate to bottom ends 116 of legs 112. For example, top end 134 of each of sail 130 can be a point, and each pointed end of sails 130 can meet and be coupled (e.g., coupled to allow rotation of sails 130) via a connector.

The connector can directly couple sails 130 to frame 110. In some embodiments, sails 130 can extend along the entire height 104 (e.g., distance in the direction of central axis of rotation 102) of turbine 100. Otherwise, sails 130 can extend only partially along height 104 of turbine 100 and a connector can have a length that allows sails 130 to be connected to frame 110.

Sails 130 also include exterior side 136 and opposing interior side 138, both disposed between bottom end 132 and top end 134. At least a portion of exterior side 136 and/or at least a portion of interior side 138 can be free (e.g., not coupled to other sails, frame 110, and/or the base). By allowing the sides of sails 130 to be at least partially free, dead zones (e.g., areas of zero or negligible fluid flow) can be reduced (e.g., when compared with a sail in which the interior side is coupled to a post). The lack of a mast, which would serve as an obstruction to the crossflow of air between vanes, is also beneficial because it allows air to flow between vanes, further improving operating efficiency. This distinguishes described embodiments from most rigid-vane crossflow wind turbines, which have additional structures external to the rotating turbine to channel airflow from a larger swept area into the smaller turbine. This is done to reduce the already high cost of large-scale rigid-vane crossflow designs. Accordingly, described embodiment avoid cost problems or mechanical/operational problems associated with crossflow vertical-axis wind turbines Further, the vertical taper of described embodiments increases stability, especially in high-speed or gusty winds. In contrast, known cylindrical crossflow designs require an additional structure at the top to hold the vanes in place, basically identical to what is used at the bottom (or opposite end of the turbine). Although the swept area is greater, the costs and mechanical issues have been demonstrated in practice to not be worth it.

In some embodiments, connectors can couple proximate corners of sails 130. For example, a connector (e.g., a chain linkable to a grommet on a sail) can couple each corner of top end 134 of the trapezoidally shaped sail 130. The connectors can meet at a common point and couple to frame 110. In some embodiments, other shapes can be utilized as appropriate. Further, sails 130 and/or connectors can couple at a common point prior to coupling to frame 110. For example, connector(s) can couple with ends of triangularly shaped sails 130 at a common point (e.g., a single connector can couple all sails 130 and/or multiple connectors can be utilized to couple two or more sails together). The connector can extend from the common point to frame 110 (e.g., to couple proximate the second end of Legs 112). In some embodiments, when sails 130 and the connectors are coupled, an approximately conical shape (e.g., area of rotation of sail 130 and/or including the area disposed between connectors) or portion thereof can be formed.

Sail 130 can include batten or cross-member 106 to inhibit cupping of sail 130 during rotation. Cupping can increase drag of sail 130 and therefore reduce power generation of a turbine. Sail 130 can include an opening (e.g., sleeve, pocket, recess, etc.) to receive a cross-member. For example, sail 130 can include one or more sleeves disposed between its interior side and exterior side. Cross-member(s) 106 can be disposed (e.g., removable and/or fixedly) in the sleeve(s), can be disposed in turbine 100 parallel to the edge of interior end 138 of sail 130 and/or approximately perpendicular to central axis (e.g., axis of rotation) 102.

Referring to FIG. 1C, base 120 includes a plurality of spokes 122. According to the illustrated embodiment, six (6) of spars or spokes 122 have similar shapes and/or sizes. By utilizing spokes 122 with similar sizes, installation of turbine 100 is simplified (e.g., when compared with base members that have different size pieces) since spokes 122 are not required to be individually labeled and/or positioned.

Each spoke 122 includes interior end 124 and opposing exterior end 126. As illustrated, interior end 124 of each spoke 122 can be coupled to another spoke 122 and the exterior end 126 of each spoke 122 can be free (e.g., not coupled to another spoke 122). Spokes 122 can be coupled together to form an approximately hexagonally-shaped hub 128 with six (6) free ends (e.g., exterior ends) of spokes 122 radially disposed about hub 128.

Figure 1D:
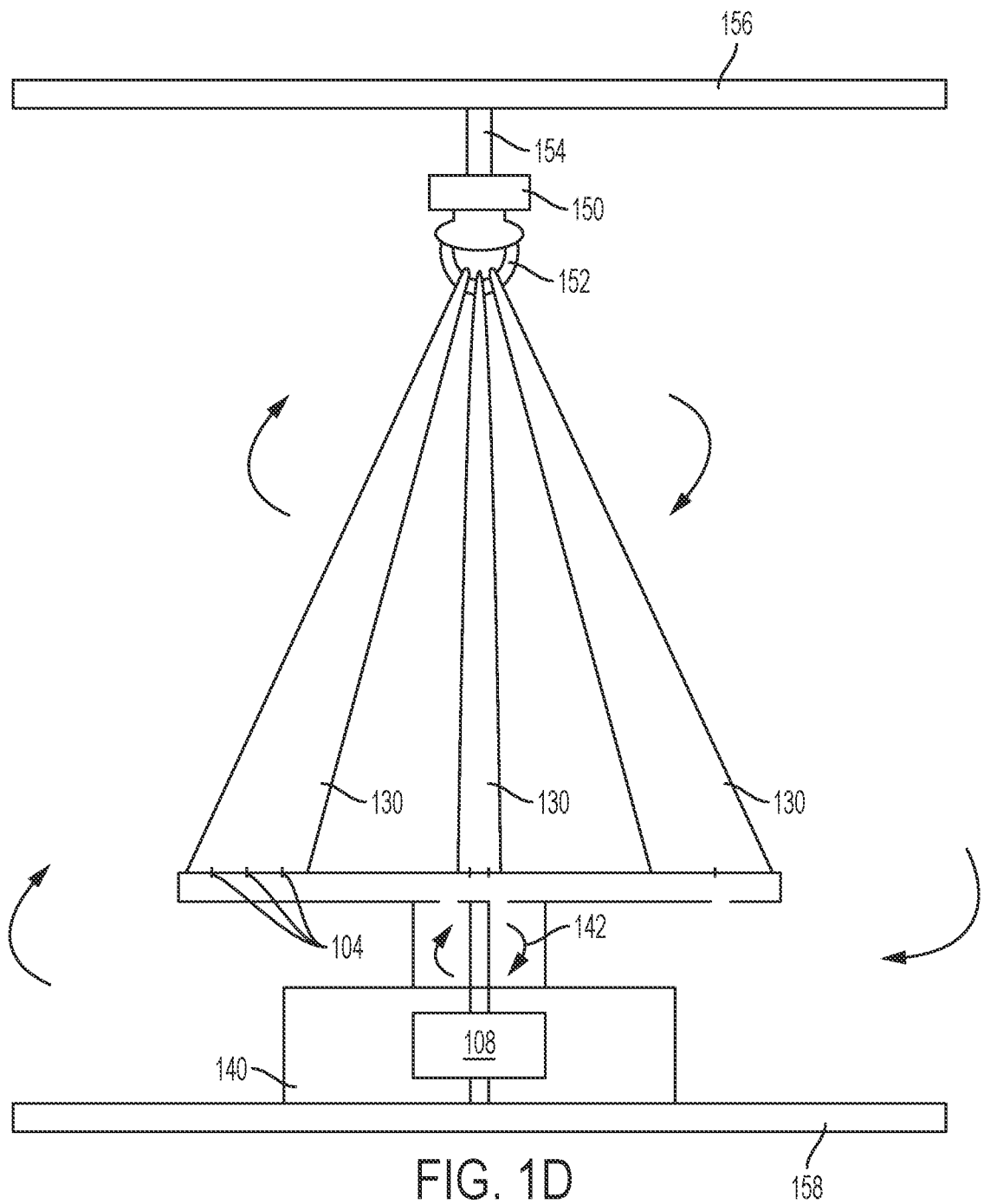
FIG. 1D illustrates aspects of an example of a wind turbine according to one or more aspects.

FIG. 1D illustrates an example of mastless turbine 100 where an external frame is not utilized. Instead, a central connector is utilized to couple sails 130 to a stationary support, such as support 156. As mentioned, such embodiments are useful where turbine 100 is implemented in locations that are mobile or the like. According to the illustrated embodiment, turbine sails 130 are placed at tension about their top edges by meeting at a central connecting point 150 that is allowed to rotate at its lower end 152, while remaining fixed at its top end 154. This can be effectuated by using a bearing mechanism or the like. Sails 130 attach to connecting point lower end 152, which can comprise a hook, loop, latch, or the like, that reversibly couples to sails 130. During operation, connecting point lower end 152 rotates with respect to connecting point top end 154, which does not rotate. Further connecting top point 154 attaches to stationary support 156. Support 156 can be any component sufficient to support the weight of connecting point 150 and supports same when turbine 100 is placed under tension at connecting point 150. In some embodiments, support 156 can be a guideline or rail on a watercraft, and the like. Further, several of turbines 100 can be placed along the length of support 156 in daisy chain fashion, providing an array of turbines 100. In this embodiment, platform 142 and stand 140 can be components sufficient to place tension on turbine 100 about the bottom edges of sails 130 while remaining fixed to a bottom stationary support 158. While not required, in the illustrated embodiment generator 108 is housed within stand 140 and rotates therein in response to the rotation of sails 130. Further, bottom stationary support 158 can be a fixed component in a watercraft or the like. As one can see, such an embodiment is advantageous because it can be implemented in positions that are themselves mobile or otherwise inaccessible to turbines that require a fixed central mast.

Figure 2:
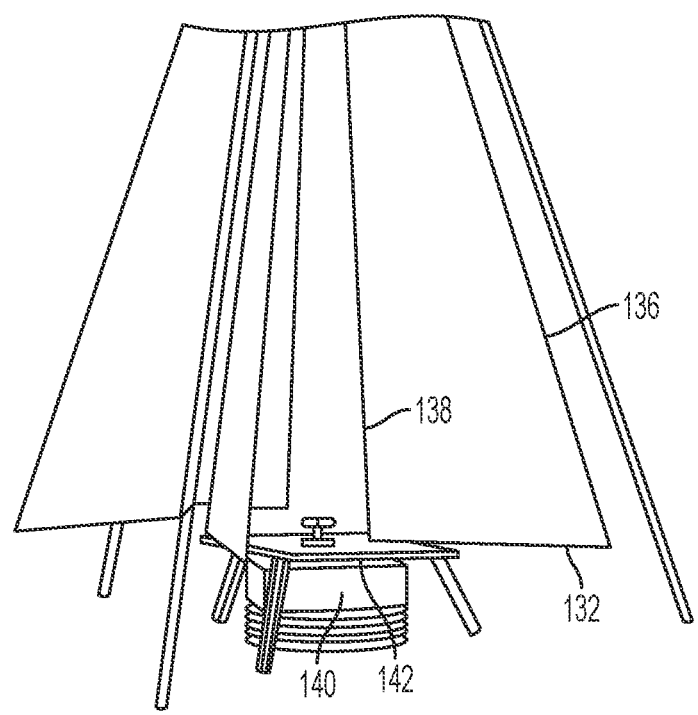
FIG. 2 illustrates aspects of an example of a wind turbine according to one or more aspects.
Figure 3A:
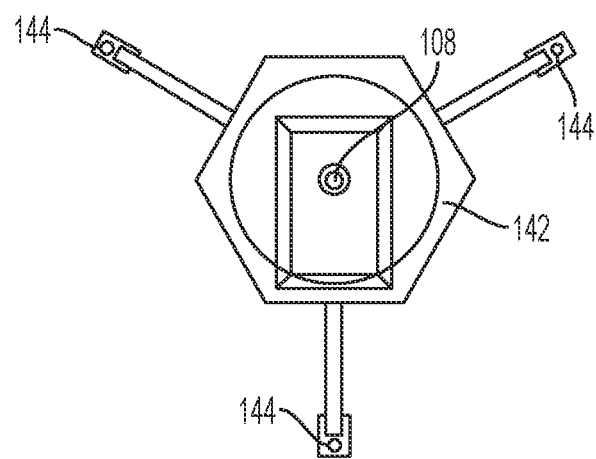
FIG. 3A illustrates aspects of a platform of a wind turbine according to one or more aspects.
Figure 3B:
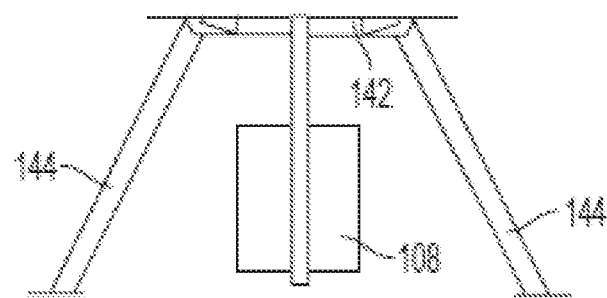
FIG. 3B illustrates additional aspects of a platform of a wind turbine according to one or more aspects.
Figure 3C:
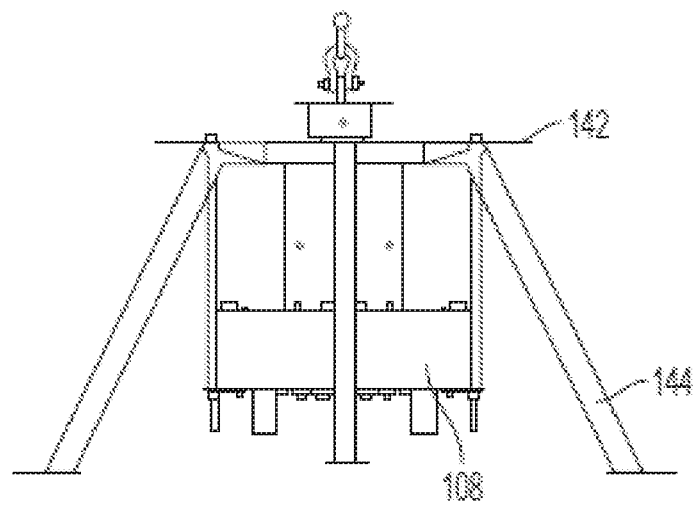
FIG. 3C illustrates additional aspects of a platform of a wind turbine according to one or more aspects.
Figure 3D:
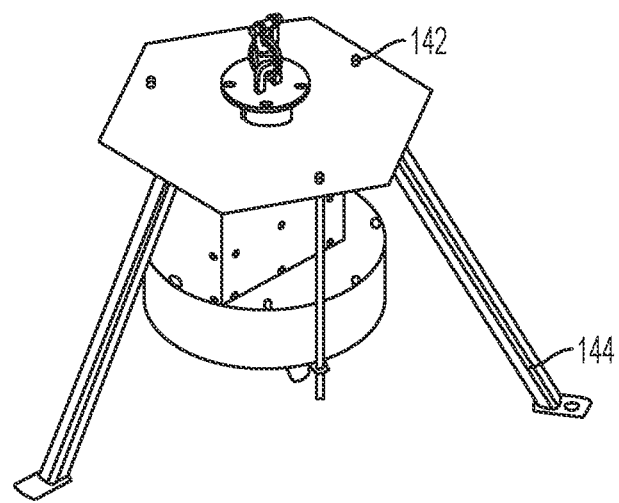
FIG. 3D illustrates additional aspects of a platform of a wind turbine according to one or more aspects.
Figure 3E:
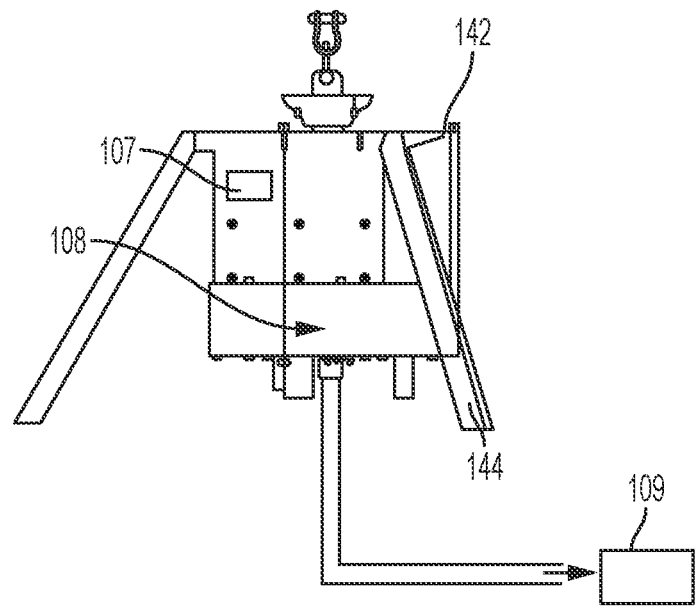
FIG. 3E illustrates additional aspects of a platform of a wind turbine according to one or more aspects.
Figure 3F:
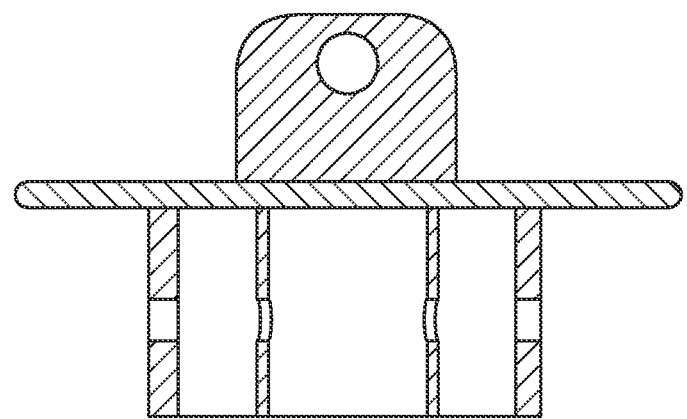
FIG. 3F illustrates additional aspects of a platform of a wind turbine according to one or more aspects.
Figure 3G:
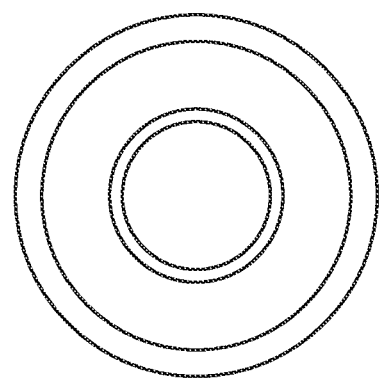
FIG. 3G illustrates additional aspects of a platform of a wind turbine according to one or more aspects.
Figure 3H:
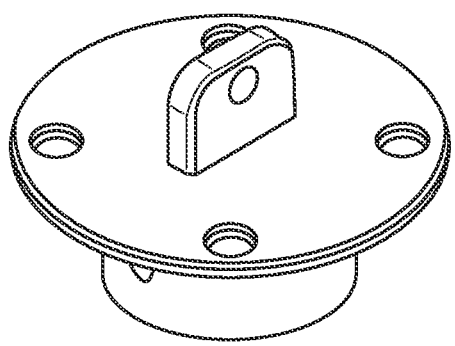
FIG. 3H illustrates additional aspects of a platform of a wind turbine according to one or more aspects.

FIG. 2 illustrates a perspective view of a portion of turbine 100 implemented on stand 140 and platform 142. As discussed, stand 140 can, in some embodiments, house generator 108 and have mechanism that allow for energy transfer to a remote location such as, e.g., energy storage 109. From there, energy can be transferred to various end users for different applications. Again, platform 142 can rotate with sails 130 and can be solid (as illustrated in FIG. 2), or comprise spokes or spires (as illustrated in FIG. 1C), where each spoke extends along the length of a bottom edge of a corresponding sail 130.

A six (6) sail turbine with a hexagonal hub and spoke base (e.g., as illustrated in FIG. 1C) can generate power and efficiencies over turbines with a different numbers of sails. This is illustrated where, in FIG. 1C, there is a corresponding sail 130 extending from each spoke 122. Experimental tests reveal that, when airflow across turbine 100 is considered, backwind drag during the upwind portion of an individual sail's cycle is reduced because is falls into the "wind shadow" of the sail ahead of it. At that point, if viewed from the top, the back-winded portion of the cycle is minimal with six (6) sails. For example, four (4) sails may be inflated in a particular direction and two (2) sails may be back-winded during at least some operation of the six (6) sail turbine. There is a point during the cycle where the backwind force equals the forward force and the turbine completely stalls. Accordingly, an optimal function and cost is achieved with six (6) sails. Below that number, the function decreases dramatically. Above that number, the cost increases disproportionately with respect to performance.

Turbine 100 can be collapsible and/or formed from several uncoupleable components to allow ease of transport and/or storage. For example, legs 112 and/or spokes 122 of base 120 can be reversibly coupled to one another for easy assembly and disassembly. Sails 130 can be flexible and collapsible (e.g., capable of being rolled or otherwise reduced in size). The turbine can then be installed for operation to generate energy. Turbine 100 and/or portions thereof can also later be dissembled similarly (e.g., to discontinue operations, to move the turbine, to avoid damage due to high fluid flow, etc.).

Turbine 100 can be lightweight when, e.g., an open base (e.g., as opposed to a solid disk shaped base) is utilized. Sails 130 can be formed of lightweight material to facilitate rotation in wind and/or other fluids. In addition, frame 110 can include material that is lightweight and provides structural strength to turbine 100. Therefore, transport can be facilitated when utilized lightweight embodiments of turbine 100.

In some embodiments, turbine 100 or portions thereof (e.g., sails and/or base) can be elevated from a surface (e.g., the ground). When a lightweight turbine embodiment is utilized, if turbine 100 fails (e.g., collapse of frame 110, uncoupling of components, etc.), less damage can occur with lightweight components of turbine 100. Additionally or alternatively, using lightweight parts may enable the sails to be quickly dropped and partially furled in advance of extreme weather to reduce or prevent damage.

As mentioned, the energy generated from rotation of sails 130 can be directly and/or indirectly transmitted to a machine capable of accepting the energy (e.g., torque driven machinery, such as pumps). Therefore, irrigation systems, well pumps, showers, etc., can be directly driven by the energy from rotation of sails 130. In some embodiments, the energy from rotating sails 130 can be converted to a different form of energy such as electrical energy (e.g., via a generator) and/or pneumatic energy (e.g., via compression of air). The energy can be stored (e.g., in batteries and/or compressed air containers), in some embodiments.

Turbine 100 can be part of a turbine array and used in conjunction with an energy storage unit(s) 109. To that end, an energy storage unit 109 can be utilized in conjunction with one or more turbines 100 in the array and used to efficiently distribute energy to local or remote locations.

Importantly, the energy storage unit 109 can be utilized in conjunction with the one or more turbines 100 to produce a constant or near constant energy output over time and under varying conditions. That is, during operation, all or a portion of the energy generated by the one or more turbines 100 can be distributed to the energy storage unit 109. During periods of low wind speed, and likewise, low turbine power output, the energy storage unit 109 can be used to increase overall energy output to compensate for a decrease in turbine energy output. During periods of high wind speed, and likewise, high turbine power output, the energy storage unit 109 can be used to provide no or minimal energy output to maintain overall energy output at a constant or near constant level.

Referring to FIGS. 1A-1D and FIG. 2, in some implementations, stand 140 can be utilized with turbine 100. Generator 108, which can be housed in stand 140, is, of course, utilized as a means to extract power from turbine 100. While generator 108 and stand 140 are, in one respect, ancillary to turbine 100 itself, instantiation of each is necessary for an integrated system, according to some embodiments. In the illustrated embodiment, generator 108 and stand 140 can be generic where a variety of generators, alternators, and gearbox setups are possible beneath a single stand design.

Nevertheless, embodiments are intended to require only minimal cost. To minimize cost and increase operational efficiency, embodiments involve transmitting torque from turbine 100 to generator 108 (which may function as an alternator) and isolating the alternator and its internal bearings from undesirable dynamic loads (anything other than rotating torque) that might be transmitted from turbine 100. Also, embodiments provide solid anchoring of turbine 100 to minimize horizontal and vertical displacement or movement of turbine 100 while allowing rapid, modular deployment of components as well as access for maintenance or replacement/swap-out of components as necessary, with minimal effort, and with safety at the forefront.

Also, it has been recognized that use of an alternator (not shown, in communication generator 108) that operate at the same RPM as turbine 100 becomes less economical as the size of turbine 100 increases. Therefore, a gearbox can be used in generator 108 to "step-up" the RPM rate so that the power of turbine 100 can be matched to the power output and voltage/current ranges of alternator. For a given turbine 100, a single, "one size fits all" stand would be desirable. The 3-stage design of the stand, the gearbox, and the alternator satisfies this.

FIGS. 3A-3H illustrate various views of an example of stand 140. Stand 140 holds an alternator or pump in position beneath turbine 100, to prevent it from rotating. For instance, if turbine 100 is implemented on a watercraft, it would be desirable to house the entire unit in a "hat box" type of arrangement, to keep salt water and spray out of it as much as possible. In any event, the design of components beneath turbine 100 can be ancillary to turbine 100 itself.

The illustrated implementations enable a gearbox appropriate to almost any alternator, pump or other apparatus to be attached to turbine 100. The upper end of the gearbox fits into a receptacle on the underside of the top pate of stand 140. It is pulled into position by attaching the alternator to the gearbox (matching hardware depends on alternator design), and jacking it upwards into place by alternately rotating the three jackscrew rods. During this process, the shaft at the top of the gearbox moves upwards into position through a hole in the center of the top plate of stand 140. This hole is surrounded by the male end of the labyrinth seal (just a ½-inch high pipe section of proper diameter). Near the top of the shaft, horizontal cross-hole accommodates a bolt which goes through the drive plate and shaft. This arrangement holds the gearbox and alternator securely in place, meeting all of the requirements listed above.

Referring to FIGS. 3A-3H, stand 140 can include platform 142 and a plurality of legs 144. Stand 140 can also house generator 108. Platform 142 can support a machine that is, for example being directly driven by turbine 100 and/or converting the energy produced into a different form of energy (e.g., generator 108). As seen in FIGS. 3A-3H, generator 108 can be coupled to platform 142 of stand 140. Legs 144 of platform 142 can be coupled to the ground proximate turbine 100. Stand 140 can at least partially secure the machine and the connection between the machine and turbine 100 during the stresses of operation (e.g., torque applied to stand 140 from the rotation of sails 130).

Access ports can be added to the gearbox so that it can be inspected and lubricated without dropping the entire box down with the jackscrews and removing the side plate from the gearbox. The exact axis of rotation for the alternator does not need to be aligned with the turbine 100. Only the drive plate at the top of the stand does. Even this can be a little bit off, up to a couple of inches, which is an indication of the robustness of this design.

The following examples illustrate the various end use applications, functionality, and advantages provided by aspects described herein.

Example 1

In some embodiments, turbine 100 can be utilized in combination with a shelter. For example, turbine 100 can include an external frame, sails, and a base. Sails 130 can be coupled proximate a first end to base 120 and coupled (e.g., directly or indirectly) to the external frame proximate the second opposing end. The external frame can include a first end and a second opposing end. The second opposing end can be disposed proximate the ground. Sails 130 and base can be disposed proximate the first end of frame 110. The external frame can have a height (e.g., distance between the first end and the second end) that provides a shelter for people, animals, and/or other appropriate people or items (e.g., machinery) beneath sails 130. For example, sails 130 can be disposed at a height (e.g., greater than or equal to approximately 6 feet, 8 feet, etc.) above the ground and/or second end of frame 110. As a result, a cavity can be disposed in frame 110 below sails 130. This cavity can be utilized for shelter and/or storage. In some embodiments, a roof can be disposed below sails 130. In some embodiments, sails 130 and/or base member can be coupled to a device (e.g., a generator) to utilize, convert, and/or store the power generated by turbine 100. The device can be disposed on stand 140, on the ground, and/or on a roof of the shelter. Therefore, the assembly with turbine 100 and shelter can provide power and/or shelter to people, animals, and/or other appropriate animals or devices.

Example 2

Figure 4:
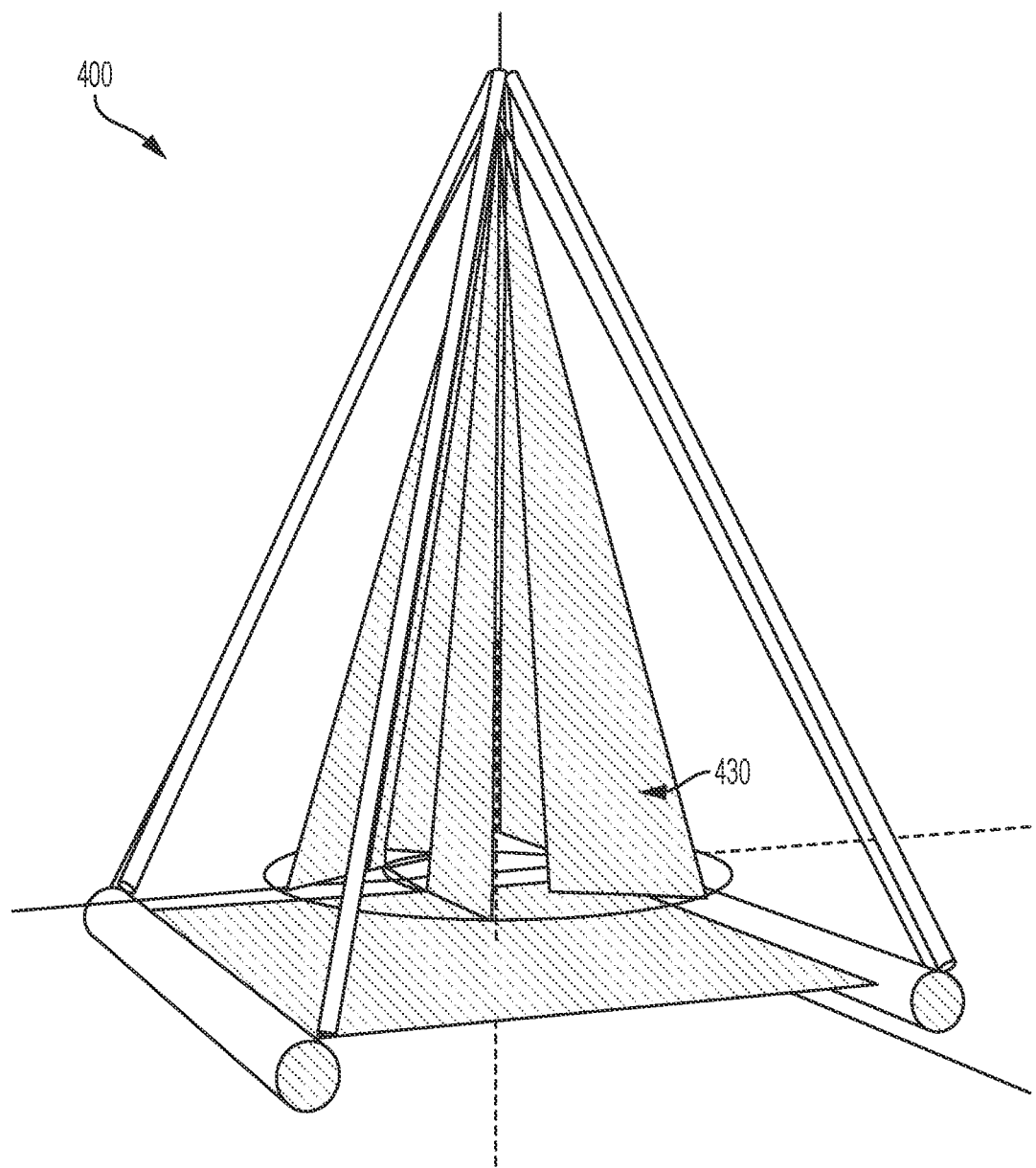
FIG. 4 illustrates an example of a wind turbine according to one or more aspects.

Referring to FIG. 4, turbine 100 can be implemented as a watercraft sail turbine 400. For instance, turbine 400 cab be implemented on a catamaran or the like. According to such an embodiment, turbine sails 430 absorb wind energy and convert same into rotational torque. The torque can either drive a generator, mechanical linkage to a propeller, or pump mechanism. Energy can be stored in the form of batteries, H2 (fuel cells), compressed air, etc. Advantageously, a water craft can steer in any direction (e.g., unlike a traditional sailboat) and maintain operation of turbine 400. Turbine sails 430 can be raised or lowered at any time. With stored energy the water craft can continue to operate with sails 430 lowered or without wind. The catamaran can be manned or remotely/autonomously piloted. Turbine 400 can be scalable from very small, i.e., <1 meter, to 10s of meters.

Example 3

Turbine 100 can be used to pump water from a well. Turbine 100 can replace traditional windmills, which can often include heavy metal objects suspended in the air, and/or electrical pumps, which can be costly to operate. The described turbine can be quieter than standard pumps.

Example 4

Turbine 100 can be utilized in combination with water purification systems. Some types of water purifiers (e.g., reverse osmosis) require only that water be pumped through them to purify water. Therefore, turbines can be used to pump water through the water purification system and provide cleaner water to an end user. In conventional water purification systems, power is usually supplied in electrical form, via utility, solar panels, electrical wind turbines, or animal power. However, turbine 100 can be connected directly to pumping mechanisms, eliminating the requirement for electrical subsystems. This setup increases reliability and improves safety, while reducing cost. Further, such a setup can be built at any appropriate scale.

Example 5

Turbine 100 can be used in an inverted arrangement in a body of water. Sails 130 can be rotated by the flow of water over sails 130 and the energy generated can be provided to directly or indirectly drive a machine, converted to another form of energy, and/or stored.

Example 6

A wind turbine can be provided as follows. The vertical axis conical sail turbine is a form of cross flow turbine that is comprised of rigid or flexible (e.g., fabric) sails, supported externally by tensile elements (halyards, etc.) at the top, held open and in shape at the bottom by one or more spar elements.

To enable and facilitate rotation, the suspension arrangement involves the use of a swivel bearing above the top of the wind turbine, to which the halyard and associated rigging is connected. Alternatively, the swivel can be connected directly to the supporting member, provided that the support can be adjusted in order to create the proper tension in sail 130 members (especially if these are non-rigid).

Turbine 100 can be used to perform useful work, as the flow of working fluid (usually air or water) moves generally across and through turbine 100 transverse to turbine 100's axis of rotation. In other words, turbine 100 rotates around a vertical axis in response to generally horizontal fluid flow.

The power of the working fluid impinging on the device is well-known, and expressed as the cube of the velocity (u) of the fluid multiplied by turbine 100's frontal cross sectional area (A), multiplied by the density of the fluid (p or rho), or as the equation:

$$P\_impinging = 0.5 * u^3 * A * p$$

The Power extracted from a given turbine (if that is its intended purpose), is considerably less than the impinging power, and can be represented with the introduction of a coefficient of harvest (C harvest), such that:

$$P\_harvest = P\_impinging * C\_{harvest}$$

For fluid-based turbines, C_harvest is limited by the Betz limit, and typically much lower. Horizontal axis turbines typically operate with a C harvest of 0.25 to 0.40. Vertical axis turbines have lower C harvest values because a portion of turbine 100 is always driving into the wind, lowering efficiency, creating drag.

Not all wind or fluid energy harvesting situations are best determined by considering only the mechanical efficiency of the device. Overall economic efficiency, or applied utility, given particular circumstances, can offer compelling reasons for the embodiment of less aerodynamically efficient devices. Some of these reasons might include: cost; safety factors; size of individual components and relationship to infrastructure for access and Maintenance; environmental impact; creation of so-called wind-shadows; noise; effects on wildlife (hazards to flying creatures, etc.); aviation hazards; radar interference, and limitations imposed by application (e.g., marine use, portability, etc.).

The wind turbine would therefore be one that for a particular purpose is the best overall fit to a list of requirements and constraints, including but not limited to those listed here.

In Situ measurements of mastless turbine 100, with the originally shown embodiment using a pair of curved sails, have demonstrated C_harvest values in the range of 02 to 0.22 in relatively low wind speeds of up to 8 meters per second. This is considerably greater than the originally anticipated C_harvest of 0.15, which is the range of Savonius turbines (from which the original base shape is derived). The reasons for this apparent increase in C_harvest remain under study, but are believed to be related to the conical shape of sail 130 members, which add a vertical slope component and allow vertical shedding of drag (similar to a motorcycle fairing) that does not occur in a typical Savonius design.

The power from turbine 100 is extracted from a mechanical linkage to turbine 100's base spar (or spar system), in the form of rotational torque, where Power is expressed as a function of the Torque multiplied by the rate of rotation.

The rate of rotation of all forms of sails 130 is limited at the outside edge of turbine 100 by the speed of the wind itself. In other words, the tip speed ratio is at or below approximately 1:1 of that of the wind speed. Application of a load to turbine 100, to extract power, inhibits the rate of rotation. Various forms of tuning of power extraction, usually through gating of electrical power, can be employed so that turbine 100's rotational rate is at its most efficient with respect to the wind speed. Overly dragging turbine 100 results in wasted energy due to turbulence, although in many instances this might be tolerable, as tuned power extraction systems add cost.

Sail Design and Configuration

According to an embodiment, a minimum number of sails is generally considered to be two sails, which also might be made as a single sail with a curvature through the middle (with or without gaps for cross flow of working fluid). Non-cross flow variations are less efficient and are therefore of reduced utility.

The use of curved sails, while aerodynamically desirable, does have its downside. The shape of the curve at base 120 is a complex recurve resulting from the oblique Cone-Shape of Turbine 100

If the curvature is not precisely constructed (which includes all seaming and mounting), turbine sails 130 end up with wrinkles and kinks and are less than ideal, both in performance and aesthetics. Furthermore, as the scale of turbine 100 increases, curved battens must be introduced which increase complexity and cost.

Variations of turbine 100 with more than two sails are envisioned. Among these variations, changes in the curvature of sails 130, including no curvature, are included as potential embodiments. To that end, a variation of turbine 100 with six (6) flat sails can be easily constructed, but any number of sails might be considered. It has been determined that an embodiment with six (6) sails is an attractive configuration, being less costly, easier to construct and transport, etc., than the two (2) sail version.

For a multi-sail version, base 120 (or spar) consists of several identical components (straight or curved, but straight is shown), which can be attached to create the final spar shape. Sails 130 are attached to the spar by various means, including beaded welting, looped fabric over the spar, hold-down lines, etc.

As an example, a perfect hexagonal shape is formed from 6 identical spars, connected to each other at their midpoint. This geometric configuration results in 60 and 30 degree angles, with the spars joined at exactly their midpoints to the end of the succeeding spar. These straight components are easy to store and transport (relative to a curved spar), as they can be bundled and fit into a container or bag. The spar length to overall diameter can be expressed as the tangent function of 30 degrees times base diameter (0.5773*D). This is convenient because construction requires little in the way of precise tooling or measuring of angles—all of the angles are a result of lengths of components.

Base length of sails 130 is nominally from the outermost end of the spar to the midpoint of the spar, but can be more or less as experiments reveal the most economical configuration. More sail material increases costs of materials so must be balanced against energy harvest efficiency. The minimum amount of sail material possible should be employed in turbine 100's construction to minimize cost.

The flat triangular shape of sails 130 in the multi-sail configuration is easy to fabricate, especially if made as flat sails (having no curvature in the radial direction). As a triangle, the letters A, B, and C can be used to designate the bottom inner, bottom outer, and top vertices. By simple geometry, the three-dimensional coordinates of these vertices can be represented by points (x, y, z), where x and y represent the radial plane and z represents the axial plane, and are expressed in whatever measurements units are desired, (e.g., inches, feet, meters, etc.).

These coordinates can be used as inputs into the 3-dimensional distance formula to determine the exact lengths of the 3 legs of the sail triangle (to which there is only a single constructible solution). Once a pattern for a given sized sail is made, sails can be readily produced, and dimensions are independent of choice of fabric, color, etc. Further, computer-aided or otherwise controlled methods can be implemented to determine the dimensions of sails 130 and reproduce same in the most efficient manner.

Adaptations for Use of Mechanical Power

The rotating torque from turbine 100 can be used to directly or indirectly power electrical generators or alternators, with or without RPM/torque translation, inline (on axis) or off axis from turbine 100, or at various angles to turbine 100's axis of rotation. The electricity can be utilized in any way that electricity might be utilized to drive secondary electrical devices of all forms.

The rotating torque from turbine 100 can be used to directly or indirectly power rotating equipment not utilizing electrical means, including: pumps (water, air, or hydraulic) to drive fluid from one location to another, linear equipment (rotational to linear translation), crankshafts, and the like.

Further, use of embodiments described herein include uses in dedicated systems, such as: (1) Manufacture of Hydrogen Gas by means of electrolysis of Water ($H_2O$); (2) Charging of battery systems or connection to battery-based of fuel-cell based systems for localized energy storage; (3) Manufacture of other chemicals (e.g., methane, ammonia);

and (4) Direct or electrically operated pumping systems for water purification, desalination, or sewage treatment. As an example, a 1-meter (base diameter turbine) operating at an NCF of 0.2, can produce 50-100 gallons of desalinated potable water per day, enough to meet the survival needs of 50-100 people. A 3-meter turbine, easily set up by one or two persons, will process 9 times as much, enough for over 450 people.

Operation of Groundwater Pumps (Water Wells) Whether of Mechanical or Electrical Form Turbine 100 can also be used in a system to refit to water wells employing traditional "farm windmills." This can be accomplished with a mechanical adaptor to the well's existing down-hole apparatus. The resulting system is less costly and eliminates the climbing hazards associated with the older design. The conical turbine does not need to be directly over the well, as the mechanical power can be transmitted by means of shafts, belts, endless rope drives, etc.

Other end-use applications include: Auxiliary power for a boat, Direct mechanical operation of pumping apparatus on a boat, Bilge & other pumps, Water makers, Power for propulsion of a boat or water craft, Direct linkage to propeller or other thrust-creating system, and Indirect by means of electrical systems (batteries, fuel cells, etc.) to drive electrically driven propulsion devices. Further, one or more turbines might be employed on a vessel for this purpose, with permanent or non-permanent mast structures from which to support turbine 100

Support Structures

As discussed, sails 130 are not supported from the bottom or internally by a central shaft, but from above and below. Any support structure within reason can be used to support turbine 100, provided that it is tall enough for sails 130 to be fully deployed and for other practical matters pertaining to turbine operation, and has sufficient structural integrity to allow turbine 100's sails to be properly tensioned for operation via the halyard.

Categories of turbine support structures include: A line (standing rigging) from tree to ground or another tree or structure, from which one or more turbines can be suspended, Geological features (cliffs, between hillsides), Man-made features, Pre-existing, originally for other purposes (building, towers, masts, etc.), specially built or erected for use by sail turbines, A-frames, Open Tripods (gyns), Arches, tall single-mast tower with guys to support tower and turbines, and Lines (standing rigging) between any of the aforementioned from which one or more turbines can be suspended.

Various forms of self-erecting structures can be employed. Embodiments can be utilized in conjunction with a form of self-erecting tripod and a double A-frame that are both suitable for rapid deployment of the conical sail turbine (as well as other applications). These structures can be quickly raised from a basically flat position on the ground to fully erect by means of a single halyard attached to at or near the top of one member and run through a block or compound block set on the other member.

This structure would be suitable for use on a boat (such as a catamaran) powered by a conical sail system, as it would enable the entire rig to be lowered to deck level when desired or necessary, such as when trailering (ground transport), passing under a low-clearance obstacle, reducing windage or visibility (low detectability) when operating under powered mode.

As a ground-based system, the ability to raise and lower such a structure would be desirable as a one-person installation feature or when an approaching storm (such as a tropical cyclone) approaches.

In general, it is the intention of the inventor that these structures should not require personnel to climb to the top, and that all actions should be possible from the ground via halyards and lanyards. However, it is recognized that there might be special circumstances requiring direct access to the top of the structure. For this, permanent or temporary rungs can be added to one or more legs of the structure (provided that the strength is appropriately rated to handle the weight of a climber). Alternatively, secondary means can be used (ladders, lifts, etc.) to access the top of the structure. In all such circumstances where climbing by a human is to be considered, safety is of the utmost importance.

Another tripod raising method involves connecting all three legs at the vertex, with opposite legs, which form an A-frame, fixed the ground at their bases such that they can freely pivot upwards into deployed position. The third leg is connected to the other two at the vertex between them, and a large pin or other through-fastener holds the vertex together so that the members can be moved into upright position. In this case, base 120 of third member can be pushed or pulled (e.g., by a winch tethered to the A-frame bases) which causes the vertex to rise into position. Once erected, base 120 of the third member is securely anchored so that it will not move laterally on the ground.

Lowering the tripod is simply a matter of reversing the deployment sequence. Base 120 of the third leg is attached to a winch or other mechanism in the direction of the center between the bases of the A-frame legs, in order to control the descent. Base 120 of the third leg is pulled away from the winch while the winch is let out to control the process and prevent the structure from suddenly collapsing. This process is followed until the vertex is close enough to the ground to be supported by a smaller temporary support (or person) and then lowered the remaining distance at the center (the forces on base 120 become too strong as the vertex opening angle approaches 180 degrees).

Another way of raising the tripod is to add sections to each leg from their respective bases. The leg sections would attach by means known to the art. For example, legs 112 can be constructed of sections of pipe, necked down at the upper ends so that they can be inserted into the preceding sections, and secured with locking pins.

Safeguards

Safeguards of various forms can be employed to protect turbine 100 and people/animals from damage or injury as a result of abnormal circumstances. Turbine 100's base spar can be encircled with a hoop to reduce the possibility of collision of a person or animal moving into the spar's rotational zone.

Sensors or trips can be used to determine if an object (typically person or animal) encroaches into turbine 100's safety zone and engage to halt or slow the rotation of turbine 100. Turbine 100 spars can be positioned high enough so as to be out of the way of normal interactions with humans or animals expected to be in the area (e.g., 7-8 feet above ground).

Various means can be employed to automatically trigger release of the halyard in the event of high winds or halyard loads in excess of a predetermined value. Such devices can be purely mechanical, electromechanical, automatic, or remotely controlled. As an example, a trip mechanism can be used to simply release the halyard based on tension loading to the halyard itself. As another example, the halyard might be raised and lowered by a winch mechanism, which might be either hand-cranked or driven by electrical or hydraulic means. Also, the winch might be either manually or autonomously actuated by either on-location control systems or from a remote control point.

Ice buildup on turbine 100's sails can be anticipated under certain weather conditions. Modest ice buildup on turbine 100's sails will have little effect on operation. Moreover, the flexible nature of sails 130 will naturally provide some movement (flexion) that will tend to break ice sheets into fragments and cause the ice to shed without intervention. Due to the relatively slow rotation of turbine 100, horizontal shedding or slinging of ice over significant distances is not a hazard. Ice shedding will tend to be downwards from sails 130. In the event that drifting or shedding of ice builds up to base 120 of the spars, the worst consequence is that turbine 100 won't turn until the ice or snow obstruction is relieved. Base 120 level of turbine 100 can be engineered to account for seasonal snow depths to minimize the potential for snow-related turbine stoppages.

Hailstones are a hazard to many wind turbines, as they can cause pitting of metal blades or create cracks in fiberglass or composite blades. In Horizontal axis turbines, the hail, which is falling vertically, can impact the upward-moving blade tips at relative velocities in excess of 400 mph. In contrast, sail 130 turbines shape and materials render it virtually immune to the effects of hail. The high vertical angle of sails 130 is nearly parallel to the path of the falling hailstones, which impact sails 130 at a very high (glancing) angle. Furthermore, the flexibility of sail 130 material itself yields slightly upon impact and recovers; indeed, the same fabrics used for sails 130 are commonly used at auto dealerships in dedicated hail protection coverings or awnings.

Turbine with Stationary Sails

Figure 5A:
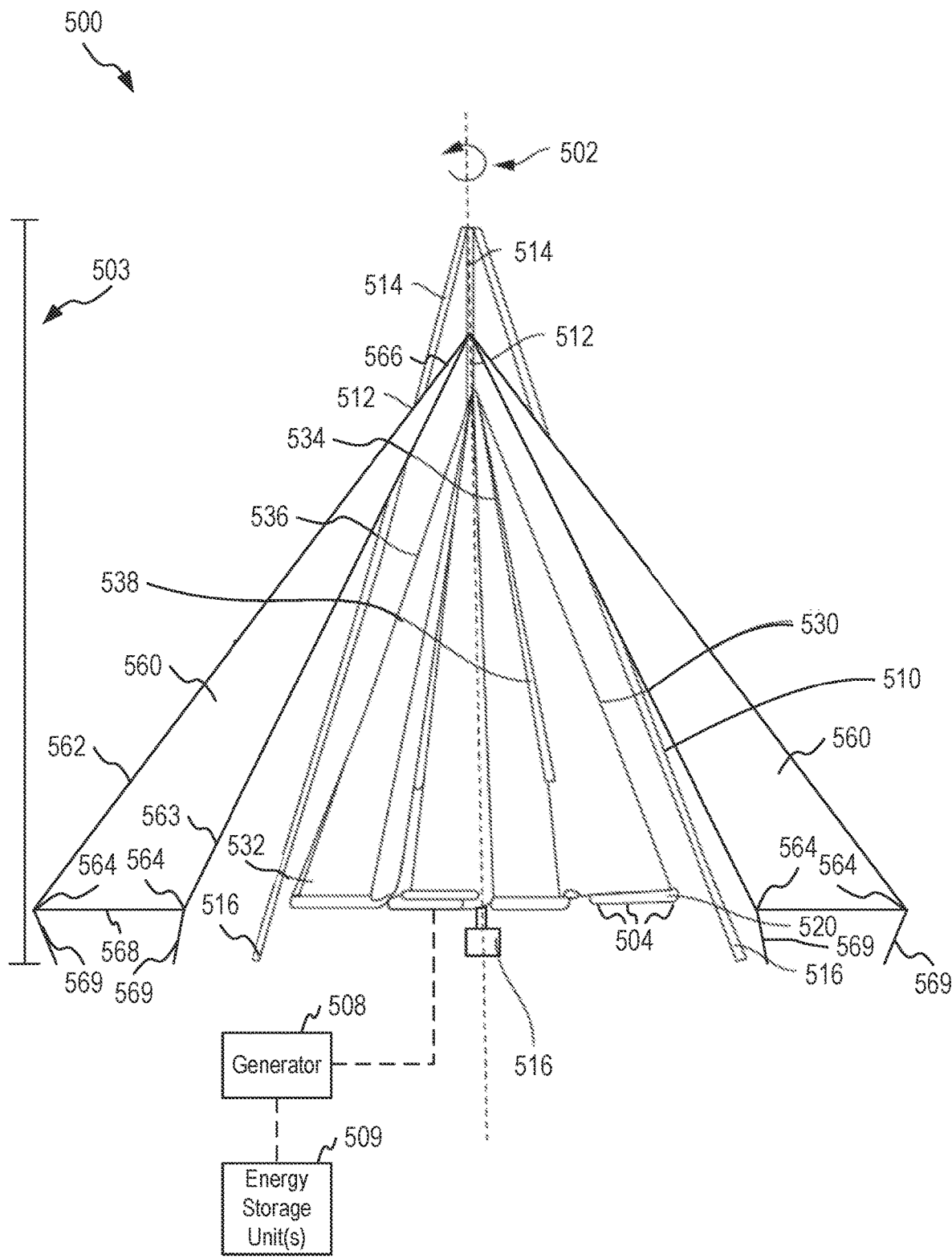
FIG. 5A illustrates a front view of an example of a wind turbine with stators according to one or more aspects.
Figure 5B:
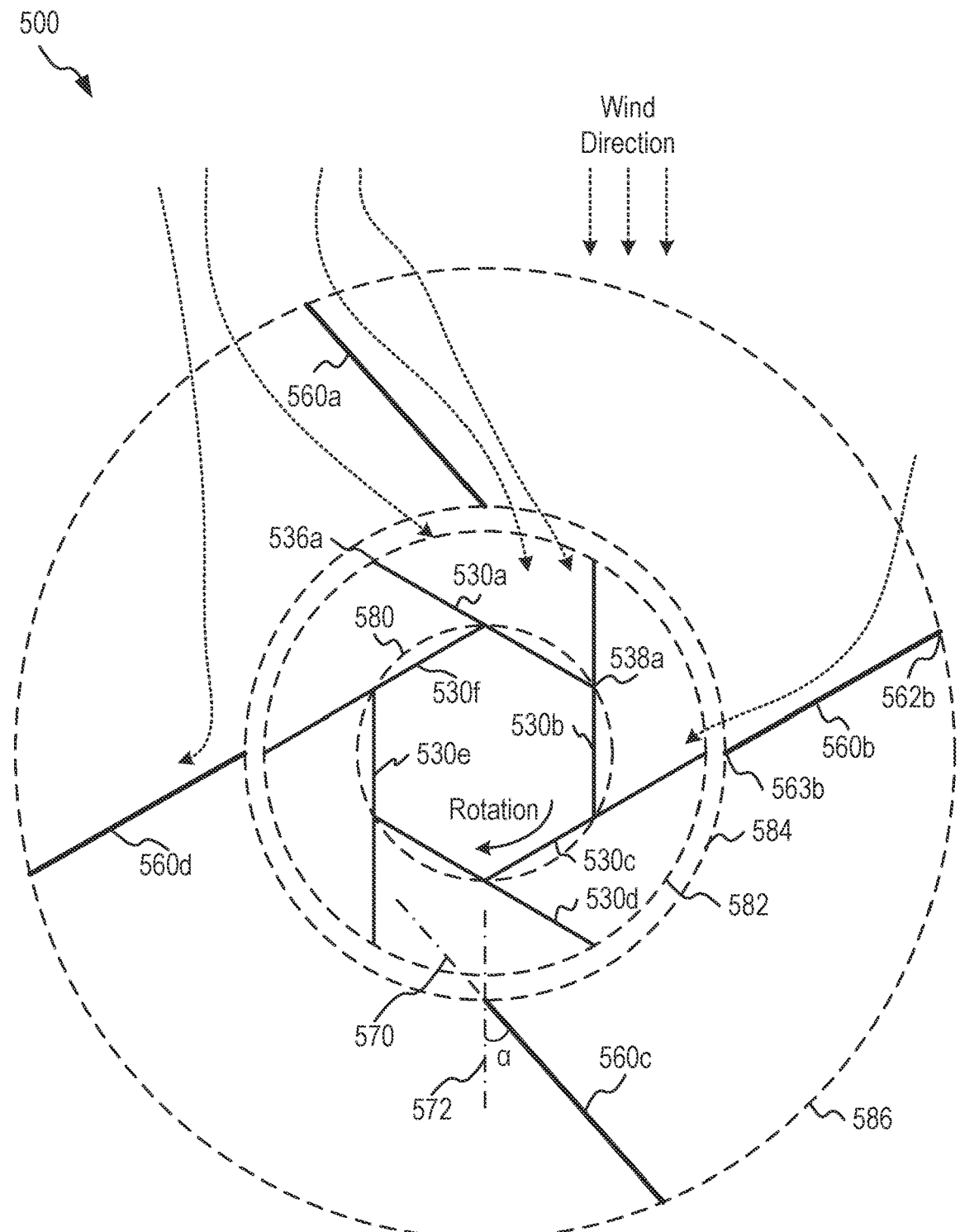
FIG. 5B illustrates a top-down view of the wind turbine with stators of FIG. 5A.

FIG. 5A illustrates a front view of an example of turbine 500 with stators (e.g., stationary sails) according to one or more aspects, and FIG. 5B illustrates a top-down view of turbine 500 with stators illustrated in FIG. 5A. Turbine 500 can be used to generate energy (e.g., mechanical and/or electrical) from air flow. For example, turbine 500 can be positioned in an area and subject to air flow (e.g., high wind speed and low wind speed).

Turbine 500 includes frame 510, rotating platform or base 520, a first plurality of sails (referred to herein as first sails 530) (e.g., vanes), and a second plurality of sails (referred to herein as second sails 560). In the implementations shown in FIG. 5A, frame 510 is an external frame (e.g., external to first sails 530) and operates to support and place tension on first sails 530 in an upward direction in the orientation shown in FIG. 5A. By placing first sails 530 under sufficient tension using frame 510, first sails 530 may efficiently rotate in response to wind without a central mast. In some other implementations, tension may be placed on first sails 530 by attaching each sail to a central point of tension that is not an external frame, such as a central hook or the like, where the hook is free to rotate at one end while being held stationary at another end. This may be effectuated through the use of bearings or the like, and is advantageous where turbine 500 is installed in compact locations where an external frame would not fit.

Frame 510 can include any appropriate material to provide the appropriate strength to turbine 500. For example, frame 510 may be formed from wood, plastic, metal or a metal alloy, or the like, as non-limiting examples. Frame 510 may at least partially support first sails 530, base 520, second sails 560, or any combination thereof, and can be self-erecting and/or manually erected (e.g., by a person).

In some implementations, frame 510 includes at least three legs 512, as shown in FIG. 5A. In other implementations, frame 510 includes fewer than three or more than three legs. Legs 512 each have top end 514 and opposing bottom end 516, and legs 512 can be positioned such that top ends 514 are disposed proximate each other while bottom ends 516 are spaced from one another about the circumference of the circle swept out by first sails 530 and/or base 520 during rotation of first sails 530. Therefore, the ends of legs 512 are uncoupled at or about a bottom portion of frame 510, and coupled (e.g., directly or indirectly) at or about a top end of frame 510. For example, frame 510 can have three legs 512 in a shape arranged as a triangular pyramid, where top end 514 of each leg 512 converges near an axis of rotation of first sails 530 while bottom ends 516 of each leg 512 are spaced from one another about the circumference of the circle swept out by first sails 530 and/or base 520 during rotation of first sails 530. In some implementations in which legs 512 include three legs, legs 512 may be disposed such that each leg extends to a position that is radially separated from positions of the other two legs by approximately 120 degrees, thereby balancing the support provided by legs 512 to turbine 500.

In some implementations, the ratio of a height of frame 510 to a width of frame 510 can be between approximately from 1-to-1 to 2-to-1, while in a preferred implementation the ratio of the height of frame 510 to the width of frame 510 is approximately 1.3 to approximately 1. However, it should be appreciated that frame 510 can be any height, even much greater than that of turbine 500 itself. For example, the height of frame 510 may be increased to increase the ground clearance of turbine 500 for any number of reasons. Further, the size of frame 510 can be selected to allow first sails 530 to rotate within frame 510 without contacting legs 512. The ratio of the height of frame 510 to the width of frame 510 can be approximately the same as the ratio of the height of first sail 530 to the width of first sail 530, and the overall height of frame 510 can be larger than the overall height of first sail 530.

Base 520 (e.g., a platform) can include any appropriate material, such as metal, fiber reinforced plastics, and/or wood. Preferably, to reduce weight of turbine 500, base 520 can form an open frame (e.g., at least approximately 50% of the footprint of base 520 is open and/or components of base 520 comprise an area of less than approximately 50% of the footprint of base 520). Base 520 may be unitary or may be assembled from multiple pieces or components, and may have any shape, such as a circular shape, an ellipsoid shape, a polygonal shape, a more complex shape, or another shape, and the shape of base 520 may depend on the number of sails included in first sails 530. Base 520 may be coupled to or in communication with a generator 508 that is configured to generate energy based on rotation of base 520 and/or first sails 530, as described above with reference to generator 108 of FIGS. 1A-D and FIG. 2. In some implementations, generator 508 may be centrally aligned with axis of rotation 502. Additionally or alternatively, generator 508 may be coupled to or in communication with one or more energy storage units 509, such as one or more batteries, power cells, or the like, that are configured to store energy generated by generator 508.

First sails 530 can rotate in the presence of a fluid flow (e.g., wind) about a central axis of rotation 502 to generate energy. Each of first sails 530 may have a shape that is wider at bottom end 532 than at top end 534. For example, first sails 530 may be approximately triangularly-shaped or approximately trapezoidally-shaped. When first sails 530 are positioned in turbine 500, an exterior side 536 of first sails 530 can form an approximately conical shape and/or at least a portion of a conical shape. In some implementations, the ratio of a height of one of first sails 530 to a width of one of first sails 530 can be approximately 2-to-1. In a particular implementation, the ratio of the height of first sails 530 to the width of first sails 530 can be approximately 1.3 to approximately 1.

Turbine 500 can include an even or odd number of first sails 530, where each of the sails may be formed of any appropriate material. In some implementations, first sails 530 can include a material that allows first sails 530 to collapse, be rolled, and/or otherwise reduced in size for storage, transport, and/or other appropriate reasons (e.g., winds exceeding a predetermined maximum velocity). For example, first sails 530 may include one or more types of fabrics, plastic, one or more synthetic fibers, other materials, or a combination thereof, as non-limiting examples.

As shown in FIG. 5A, each of first sails 530 has bottom end 532 and top end 534. At least a portion of bottom end 532 can be coupled to base 520 at attachment points 504. Bottom end 532 (e.g., a particular end of first sails 530) can extend along a length of base 520. In some implementations, widths of first sails 530 can be approximately the same as the length of base 520. At least a portion of top end 534 (e.g., an opposite particular end of first sails 530) can be coupled directly or indirectly to frame 510 or another top tension point. For example, first sails 530 can be coupled together and/or coupled to a connector (not shown) that couples to frame 510 (e.g., a top portion of frame 510 where legs 512 are coupled). A gap can be disposed between top ends 534 of first sails 530 and top ends 514 of legs 512. This gap can facilitate rotation of first sails 530 and/or connection of first sails 530 to frame 510. For example, top end 534 of each of first sails 530 can be a point, and each pointed end of first sails 530 can meet and be coupled (e.g., coupled to allow rotation of first sails 530) via a connector. The connector can directly couple first sails 530 to frame 510. Bottom ends 532 of first sails 530 can be proximate to bottom ends 516 of legs 512. In some implementations, first sails 530 can extend along an entire height 503 (e.g., distance in the direction of central axis of rotation 502) of turbine 500. In some other implementations, first sails 530 extend only partially along height 503 of turbine 500, as shown in FIG. 5A, and a connector can have a length that allows first sails 530 to be connected to frame 510.

In some implementations, connectors can couple proximate corners of first sails 530. For example, a connector (e.g., a chain linkable to a grommet on a sail) can couple each corner of top end 534 of the trapezoidally shaped first sails 530. The connectors can meet at a common point and couple to frame 510. Alternatively, other shapes can be utilized for sails as appropriate. Further, first sails 530 and/or connectors can couple at a common point prior to coupling to frame 510. For example, connector(s) can couple with ends of triangularly shaped first sails 530 at a common point (e.g., a single connector can couple all first sails 530 and/or multiple connectors can be utilized to couple two or more sails together). The connector can extend from the common point to frame 510 (e.g., to couple proximate to top end 514 of legs 512). In some implementations, when first sails 530 and the connectors are coupled, an approximately conical shape (e.g., as formed by an area of rotation of first sails 530 and/or including the area disposed between connectors) or portion thereof can be formed.

First sails 530 also include exterior side 536 and opposing interior side 538, both disposed between bottom end 532 and top end 534. At least a portion of exterior side 536 and/or at least a portion of interior side 538 can be free (e.g., not coupled to other sails, frame 510, and/or base 520). By allowing the sides of first sails 530 to be at least partially free, dead zones (e.g., areas of zero or negligible fluid flow) can be reduced (e.g., when compared with a sail in which the interior side is coupled to a post). The lack of a mast, which would serve as an obstruction to the crossflow of air between sails, is also beneficial because it allows air to flow between sails, further improving operating efficiency and avoiding cost problems or mechanical/operational problems associated with crossflow vertical-axis wind turbines, as described above with reference to FIGS. 1A-B.

In some implementations, first sails 530 can include batten or cross-member (not shown) to inhibit cupping of first sails 530 during rotation. Cupping can increase drag of first sails 530 and therefore reduce power generation of a turbine. In some such implementations, first sails 530 can include an opening (e.g., sleeve, pocket, recess, etc.) to receive a cross-member. For example, first sails 530 may include one or more sleeves disposed between interior side 538 and exterior side 536. Cross-member(s) can be disposed (e.g., removable and/or fixedly) in the sleeve(s), can be disposed in turbine 500 parallel to the edge of interior side 538 of first sails 530 and/or approximately perpendicular to axis of rotation 502 (e.g., the central axis of turbine 500).

Second sails 560 are configured to remain stationary in the presence of a fluid flow (e.g., wind) while first sails 530 rotate about central axis of rotation 502. Each of second sails 560 may have a shape that is wider at bottom end 568 than at top end 566. For example, second sails 560 may be approximately triangularly-shaped or approximately trapezoidally-shaped. When second sails 560 are positioned in turbine 500, an exterior side of second sails 560 can form an approximately conical shape and/or at least a portion of a conical shape. In some implementations, the ratio of a height of one of second sails 560 to a width of one of second sails 560 can be approximately 2-to-1. In a particular implementation, the ratio of the height of second sails 560 to the width of second sails 560 can be approximately 1.3 to approximately 1.

Second sails 560 may include the same types of materials or different types of materials than first sails 530. In some implementations, second sails 560 can include a material that allows second sails 560 to collapse, be rolled, and/or otherwise reduced in size for storage, transport, and/or other appropriate reasons (e.g., winds exceeding a predetermined maximum velocity). For example, second sails 560 may include one or more types of fabrics, plastic, one or more synthetic fibers, other materials, or a combination thereof, as non-limiting examples. Second sails 560 may have the same shape or different shape than first sails 530, and may have the same size or different size than first sails 530. In a particular implementation, a cross-sectional area of each of second sails 560 is greater than a cross-sectional area of each of first sails 530. For example, both first sails 530 and second sails 560 may have triangular shapes, but a width of second sails 560 may be greater than a width of first sails 530. Using second sails 560 with a greater cross-sectional area than first sails 530 may increase the swept area more as compared to other implementations. Alternatively, the cross-sectional areas of second sails 560 may be the same or less than the cross-sectional areas of first sails 530.

As shown in FIG. 5A, each of second sails 560 has a bottom end 568 and a top end 566. At least a portion of bottom end 568 can be coupled to one or more stationary surfaces at attachment points 564 along bottom end 568. Bottom end 568 (e.g., a second end of second sails 560) can be coupled to one or more stationary surfaces, such as the ground, one or more non-movable bases, one or more frames, or the like, using connectors 569. For example, connectors 569 may include rope, chains, twine, cords, posts, clips, nails, screws, pegs, or any other type of component capable of coupling bottom end 568 of second sails 560 to a stationary surface. At least a portion of top end 566 (e.g., a first end of second sails 560) can be coupled directly or indirectly to frame 510 or another top point. For example, second sails 560 can be coupled together and/or coupled to a connector (not shown) that couples to frame 510 (e.g., a top portion of frame 510 where legs 512 are coupled). A first gap can be disposed between top ends 566 of second sails 560 and top ends 514 of legs 512, and a second gap can be disposed between top ends 566 of second sails 560 and top ends 534 of first sails 530. These gaps can facilitate rotation of first sails 530 while enabling second sails 560 to remain stationary. For example, top end 534 of each of first sails 530 can be a point, and each pointed end of first sails 530 can meet and be coupled (e.g., coupled to allow rotation of first sails 530) via a first portion of a connector, and top end 566 of each of second sails 560 can be a point, and each pointed end of second sails 560 can meet and be coupled (e.g., coupled to prevent rotation of second sails 560) via a second portion of the connector. For example, the first portion of the connector may be free to rotate about the axis of rotation 502 and the second portion of the connector may remain stationary, as further described below with reference to FIG. 5C. The connector can directly couple first sails 530 and the second sails 560 to frame 510. Bottom ends 568 of second sails 560 can be proximate to bottom ends 516 of legs 512. In some implementations, second sails 560 can extend along the entire height 503 of turbine 500. In some other implementations, second sails 560 extend only partially along height 503 of turbine 500, although farther along than first sails 530, as shown in FIG. 5A, and a connector can have a length that allows first sails 530 and second sails 560 to be connected to frame 510.

Second sails 560 also include exterior side 562 and opposing interior side 563, both disposed between bottom end 568 and top end 566. At least a portion of exterior side 562 and/or at least a portion of interior side 563 can be free (e.g., not coupled to other sails, frame 510, and/or a stationary surface). By allowing the sides of second sails 560 to be at least partially free, dead zones (e.g., areas of zero or negligible fluid flow) can be reduced (e.g., when compared with a sail in which the interior side is coupled to a post). In some implementations, second sails 560 may include a member, such as a spar, a boom, or the like, to increase rigidity of the sail and to provide additional support. In other implementations, no additional members are included to reduce costs of turbine 500.

Turbine 500 can include an even or odd number of second sails 560, and second sails 560 may be disposed at particular positions outside of a sweeping range of first sails 530 based on the number of second sails 560. In the particular implementation shown in the top-down view of FIG. 5B, turbine 500 includes four second sails 560 positioned proximate to and outside of six first sails 530. To illustrate, first sails 530 can be positioned to form an approximately hexagonally-shaped hub with six free ends (e.g., exterior sides 536) of first sails 530 radially disposed about a center of turbine 500 through which axis of rotation 502 extends. In some such implementations, base 520 may include multiple spokes that correspond to, and extend the length of, first sails 530 such that the spokes are disposed in the hexagonal configuration shown in FIG. 5B. During rotation of first sails 530, first sails traverse a rotational path between an inner turbine diameter 580 and an outer turbine diameter 582, where inner turbine diameter 580 is defined as the sweeping (e.g., rotating) path of interior side 538 of first sails 530, and/or an interior portion of a corresponding spoke, and outer turbine diameter 582 is defined as the seeping (e.g., rotating) path of exterior side 536 of first sails 530, and/or an exterior portion of a corresponding spoke.

In such implementations, each of the four second sails 560 may be disposed outside of the sweeping range (e.g., outer turbine diameter 582) of first sails 530 and at a respective position that is radially separated by approximately 90 degrees from positions of adjacent second sails 560. To further illustrate with reference to the orientation shown in FIG. 5B, a first one of second sails 560 (e.g., sail 560a) may be disposed substantially above first sails 530, a second one of second sails 560 (e.g., sail 560b) may be disposed substantially to the right of first sails 530 and approximately 90 degrees radially from sail 560a, a third one of second sails 560 (e.g., sail 560c) may be disposed substantially below first sails 530 and approximately 90 degrees radially separated from sail 560b, and a fourth one of second sails 560 (e.g., sail 560d) may be disposed substantially to the left of first sails 530 and approximately 90 degrees radially separated from each of sail 560c and sail 560a. Second sails 560 may be positioned such that an inner duct diameter 584 is formed by a circle connecting interior sides 563 of second sails 560 and an outer duct diameter 586 is formed by a circle connecting exterior sides 562 of second sails 560. By positioning first sails 530 and second sails 560 such that inner duct diameter 584 is entirely outside of outer turbine diameter 582, second sails 560 may be located beyond the sweeping range of first sails 530 during rotation under the influence of wind. In some such implementations, a relationship between outer turbine diameter 582 and inner duct diameter 584 may be approximately 1 to 1.1, and a relationship between outer turbine diameter 582 and outer duct diameter 586 may be approximately 1 to 2.0. In implementations in which four second sails 560 are included in turbine 500, the positioning of second sails 560 with respect to a direction of the wind may not significantly change the effectiveness of turbine 500 due to the symmetric design and the ability of at least one of second sails 560 to redirect wind flow in desired directions, as further described below.

In some such implementations, each of second sails 560 is disposed at an oblique angle from a radius of turbine 500 instead of being aligned with a radius. To illustrate, second sail 560c may be disposed such that a first axis 570 that extends from exterior side 562 of second sail 560c through interior side 563 of second sail 560c is oblique (e.g., is neither parallel nor perpendicular) to a second axis 572 that extends from the center of turbine 500 (e.g., a center of first sails 530) through interior side 563 of second sail 560c. In a particular implementation, second sail 560c may be disposed such that an acute angle α formed by an intersection first axis 570 and second axis 572 is between approximately 30 degrees and 45 degrees, such as 30 degrees in a preferred implementation. Each of the other second sails 560 may be similarly disposed and configured. The positioning and angles of second sails 560 are selected to optimize the improvement to the energy production of turbine 500. For example, in other implementations, fewer than four or more than four second sails 560 may be included in turbine 500, and accordingly the radial separation between second sails 560 may be increased (if the number of sails is decreased) or decreased (if the number of sails is increased), and the angle α may be different for different numbers of second sails 560. Additionally, including a different number of second sails 560 in turbine 500 may necessitate different positioning of second sails 560 based on direction of the wind during operation. For example, turbine designs including other numbers of sails may not be symmetric in the way the four-sail design is, such that one or more of second sails 560 needs to be positioned facing into (or away from or not along the direction of) the wind. Accordingly, other designs may require additional setup and configuration by an operator. In some such implementations, second sails 560 may be coupled to a second base that is adjustable to reposition the locations of second sails 560, such as by rotating the second base, prior to operation of turbine 500 (e.g., second sails 560 may be rotated to desired positions and then locked or affixed in place so that second sails 560 remain stationary during rotation of first sails 530 under influence of the wind).

Second sails 560 may be configured to redirect wind to increase the efficiency and power generation of turbine 500 based on rotation of first sails 530. In the example illustrated in FIG. 5B, the wind may be flowing in a downward direction that causes first sails 530 to rotate in a clockwise direction. Second sail 560a may block portions of the wind that would otherwise apply force against the rotation of first sail 530a and redirect those portions to apply force in the direction of rotation of first sail 530b, thereby reducing "counter drag" (e.g., a countering force) on first sail 530a and increasing "drive pressure" (e.g., force tangential to the direction of rotation) on first sail 530b. Second sail 560b may capture portions of the wind that would otherwise miss first sails 530 and redirect those portions to apply force in the direction of rotation of first sail 530c, thereby increasing drive pression on first sail 530c. Second sail 560d may redirect portions of the wind that would otherwise apply force against the rotation of first sail 530f and redirect those portions away from turbine 500, thereby reducing counter drag on first sail 530f. Due to the nature of the design shown in FIG. 5B, such redirection is performed by second sails 560 regardless of the direction of the wind (e.g., with different ones of second sails 560 redirecting portions of the wind in the desired directions), such that drive pressure is increased on downstream first sails 530 (e.g., sails that are rotating with or away from the direction of the wind) and counter drag is reduced on upstream first sails 530 (e.g., sails that are rotating in an opposite direction as the wind). As such, the preferred implementation of including four second sails 560 in turbine 500 as described above may represent a desired tradeoff between cost of second sails 560 and improved energy generation of turbine 500. As a particular example, the above-described implementation may represent an increased swept area of 1.93 to 1 compared to a turbine without stationary sails, for an approximately 1 to 1 or less increase in cost. Increasing the swept area increases the power generated by turbine 500, according to Equation 1 below, in which P is power, p is air density, A is rotor swept area, V is wind speed, and E is the efficiency.

Wind Power $$P = \frac{1}{2}\rho * A * V^3 * E$$ Equation 1

In a particular aspect, a mastless vertical axis wind turbine (e.g., 500) is disclosed. The mastless vertical axis wind turbine includes a first plurality of sails (e.g., 530) configured to, during operation of the mastless vertical axis wind turbine, rotate about a vertical axis (e.g., 502) under the influence of wind. The mastless vertical axis wind turbine also includes a platform (e.g., 520) coupled to the first plurality of sails and configured to, during operation of the mastless vertical axis wind turbine, be in tension with the first plurality of sails at one or more points (e.g., 504) about a particular end (e.g., 532) of the first plurality of sails. The mastless vertical axis wind turbine further includes a second plurality of sails (e.g., 560) having respective first ends (e.g., 566) that are coupled together and second ends (e.g., 568) that are each coupled to one or more stationary surfaces. The second plurality of sails are configured to remain stationary as the first plurality of sails rotate under the influence of the wind.

Figure 5C:
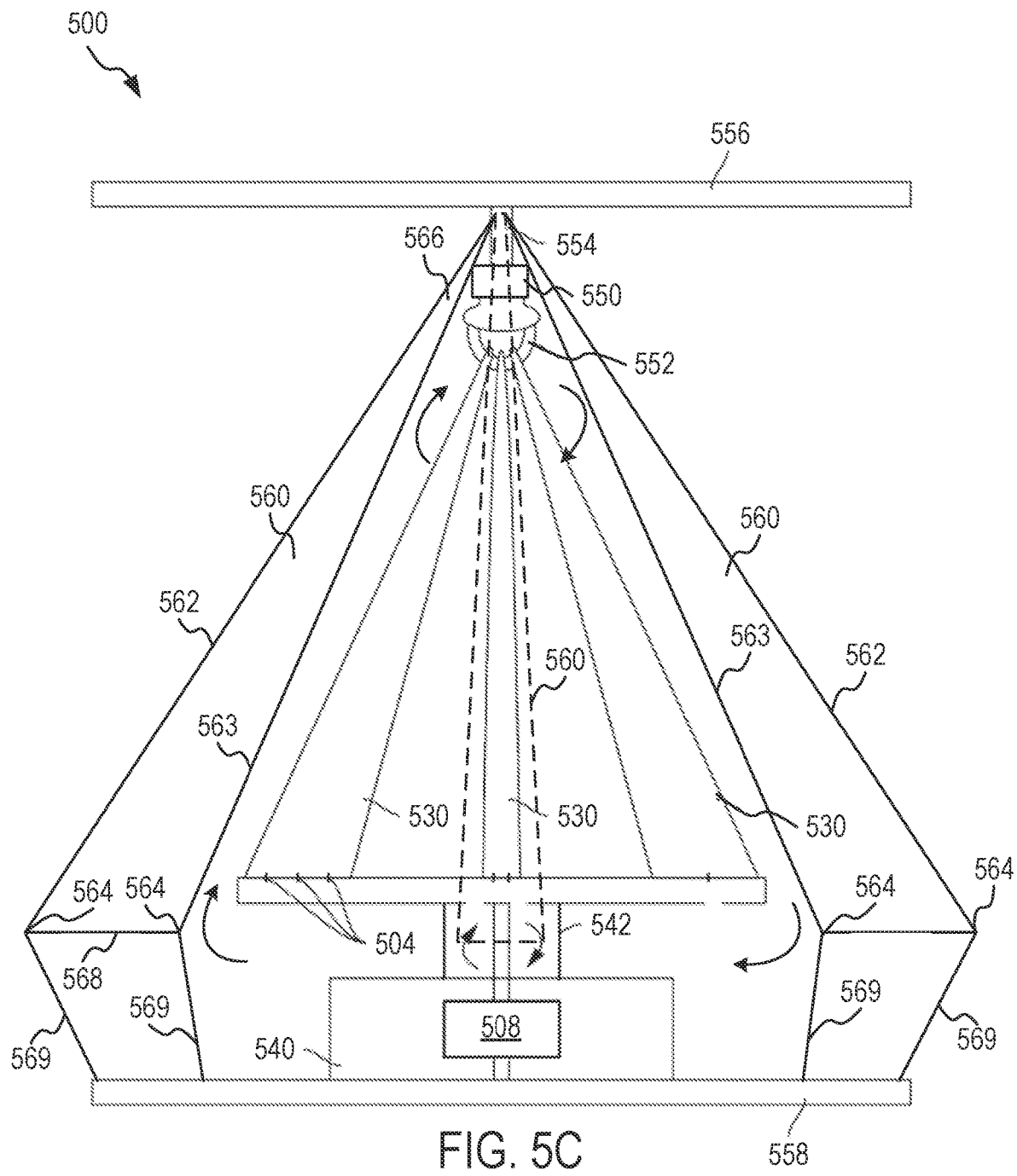
FIG. 5C illustrates a front view of another example of a wind turbine with stators according to one or more aspects.

FIG. 5C illustrates a front view of another example of turbine 500 with stators according to one or more aspects. In the implementation illustrated in FIG. 5C, an external frame is not utilized. Instead, a central connector is utilized to couple first sails 530 and second sails 560 to a stationary support, such as stationary support 556. As mentioned, such implementations are useful where turbine 500 is implemented in locations that are mobile or the like. According to the illustrated implementation, first sails 530 are placed at tension about their top ends 534 by meeting at a central connecting point 550 that is allowed to rotate at its lower end 552, while remaining fixed at its top end 554. This can be effectuated by using a bearing mechanism or the like. First sails 530 attach to lower end 552, which may include a hook, loop, latch, or the like, that reversibly couples to first sails 530. Second sails 560 attach to top end 554 that reversibly couples to second sails 560 and that remains stationary (e.g., does not rotate) during rotation of lower end 552. During operation, lower end 552 of connecting point 550 rotates with respect to top end 554, which does not rotate. Further top end 554 attaches to stationary support 556. Stationary support 556 can be any component sufficient to support the weight of connecting point 550, first sails 530, and second sails 560, and supports same when turbine 500 is placed under tension at connecting point 550. In some implementations, stationary support 556 can be a guideline or rail on a watercraft, or the like. Further, several of turbines 500 can be placed along the length of stationary support 556 in daisy chain fashion, providing an array of turbines 500. In some implementations, platform 542 and stand 540 can be components sufficient to place tension on turbine 500 about bottom ends 532 of first sails 530 while remaining fixed to a bottom stationary support 558. In the implementation shown in FIG. 5C, generator 508 is housed within stand 540 and rotates therein in response to the rotation of first sails 530. Further, bottom stationary support 558 can be a fixed component in a watercraft or the like. As can be seen, such an implementation is advantageous because it can be implemented in positions that are themselves mobile or otherwise inaccessible to turbines that require a fixed central mast.

In a particular aspect, a mastless vertical axis wind turbine (e.g., 500) is disclosed. The mastless vertical axis wind turbine includes a first plurality of sails (e.g., 530) configured to, during operation of the mastless vertical axis wind turbine, rotate about a vertical axis (e.g., 502) under the influence of wind. The mastless vertical axis wind turbine also includes a platform (e.g., 540) configured to couple the first plurality of sails to a first stationary support (e.g., 558). The platform is configured to, during operation of the mastless vertical axis wind turbine, be in tension with the first plurality of sails at one or more points (e.g., 504) about a first end (e.g., 532) of the first plurality of sails and to rotate with the first plurality of sails under the influence of the wind. The first stationary support is configured to remain stationary as the first plurality of sails rotate under the influence of the wind. The mastless vertical axis wind turbine includes a second plurality of sails (e.g., 560) having respective first ends (e.g., 566) that are coupled together and second ends (e.g., 568) that are each coupled to one or more stationary surfaces. The second plurality of sails are configured to remain stationary while the first plurality of sails rotate under the influence of the wind. The mastless vertical axis wind turbine further includes a central connector (e.g., 550) configured to couple the first plurality of sails and the second plurality of sails to a second stationary support (e.g., 556). The central connector is configured to, during operation of the mastless vertical axis wind turbine, be in tension with the first plurality of sails about the vertical axis and a second end of the first plurality of sails.

As described above with reference to FIGS. 5A-C, turbine 500 provides benefits compared to other horizontal access turbines or vertical axis turbines. To illustrate, including second sails 560 in turbine 500 improves the swept area corresponding to turbine 500 for less than 1 to 1 increase in cost. For example, including four second sails 560 may increase swept area by approximately 20-50% for a cost increase of only approximately 10%. Additionally, second sails 560 reduce parasitic losses (e.g., counter drag) on some of first sails 530 while also redirecting some of the wind to impinge more directly on some of first sails 530, thereby increasing drive pressure on some of first sails 530. This results in significant improvements to the efficiency of turbine 500 and increased power generation during operation of turbine 500. These benefits are achieved through the addition of low cost parts that do not significantly increase the overall cost or the complexity of setup or take down of turbine 500, making turbine 500 suitable for use at multiple different locations or as part of a low cost energy generation system. Turbine 500 achieves these benefits over other vertical axis turbines without the cost and drawbacks associated with horizontal turbines.

Figure 6:
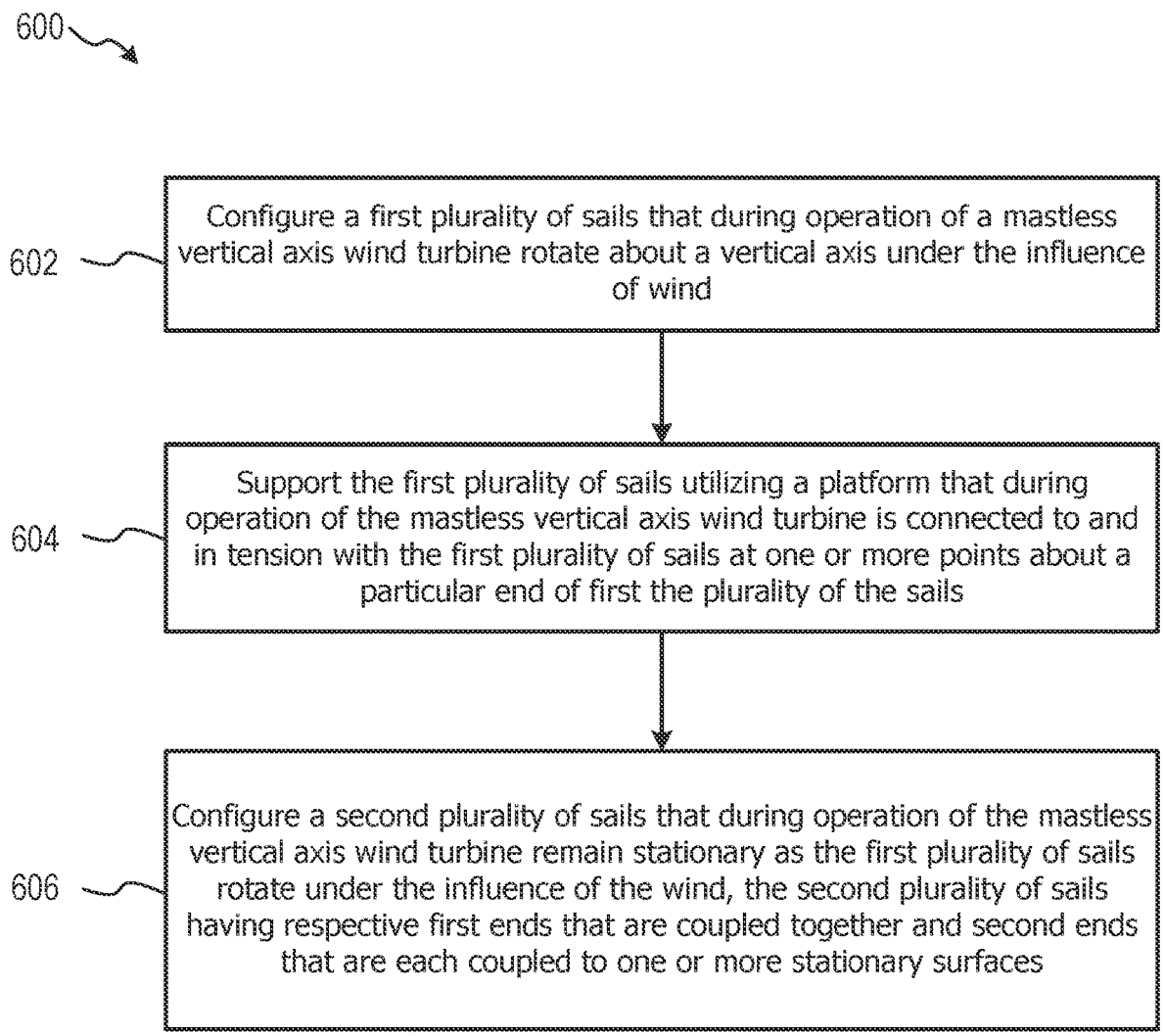
FIG. 6 illustrates a flow chart of an example of a method for generating energy using a mastless vertical axis wind turbine according to one or more aspects.

Referring to FIG. 6, a flow diagram of a method for generating energy using a mastless vertical axis wind turbine according to one or more aspects is shown as a method 600. In some implementations, method 600 may be performed using one or more of the components of turbine 500 of FIGS. 5A-C.

At 602, method 600 includes configuring a first plurality of sails that during operation of the mastless vertical axis wind turbine rotate about a vertical axis under the influence of wind. For example, the first plurality of sails may include or correspond to first sails 530 of FIG. 5A.

At 604, method 600 includes supporting the first plurality of sails utilizing a platform that during operation of the mastless vertical axis wind turbine is connected to and in tension with the first plurality of sails at one or more points about a particular end of first the plurality of the sails. For example, the platform may include or correspond to base 520 of FIG. 5A.

At 606, method 600 includes configuring a second plurality of sails that during operation of the mastless vertical axis wind turbine remain stationary as the first plurality of sails rotate under the influence of the wind. For example, the second plurality of sails may include or correspond to second sails 560 of FIG. 5A. The second plurality of sails have respective first ends that are coupled together and second ends that are each coupled to one or more stationary surfaces. For example, the first ends may include or correspond to top ends 566 of FIG. 5A and the second ends may include or correspond to bottom ends 568 of FIG. 5A.

In some implementations, the second plurality of sails includes four sails that are disposed such that each sail of the second plurality of sails is disposed at a respective position that is radially separated by approximately 90 degrees from positions of adjacent sails of the second plurality of sails. For example, second sails 560 may include four sails that are disposed and positioned as shown in FIG. 5B. Additionally or alternatively, configuring the second plurality of sails may include disposing each of the second plurality of sails such that a first axis that extends from a first side of the second end of the sail through a second side of the second end is oblique to a second axis that extends from the center of the first plurality of sails through the second side of the second end. For example, the first axis may include or correspond to first axis 570 of FIG. 5B and the second axis may include or correspond to second axis 572 of FIG. 5B. Additionally or alternatively, the mastless vertical axis wind turbine may further include a generator, in communication with the platform, that generates energy in response to rotation of the platform. For example, the generator may include or correspond to generator 508 of FIG. 5A.

In some implementations, method 600 further includes supporting the first plurality of sails and the second plurality of sails utilizing an external frame that during operation of the mastless vertical axis wind turbine is coupled to and in tension with the first plurality of sails at one or more points about an opposite particular end of the first plurality of the sails. The external frame includes a coupling mechanism that during operation of the mastless vertical axis wind turbine connects the external frame to the first plurality of sails and the second plurality of sails such that the first plurality of sails rotate about the vertical axis while the second plurality of sails and the external frame remain stationary. For example, the external frame may include or correspond to legs 512 of FIG. 5A.

Referring to FIG. 7, a flow diagram of a method for generating energy using a mastless vertical axis wind turbine according to one or more aspects is shown as a method 700. In some implementations, method 700 may be performed using one or more of the components of turbine 500 of FIGS. 5A-C.

At 702, method 700 includes engaging the mastless vertical axis wind turbine with a first stationary support and a second stationary support. For example, the first stationary support may include or correspond to bottom stationary support 558 of FIG. 5C and the second stationary support may include or correspond to stationary support 556 of FIG. 5C. The mastless vertical axis wind turbine may include a first plurality of sails that rotate about a vertical axis under the influence of wind. For example, the first plurality of sails may include or correspond to first sails 530 of FIG. 5C. The mastless vertical axis wind turbine may include a platform configured to couple the first plurality of sails to the first stationary support. The platform is configured to, during operation of the mastless vertical axis wind turbine, be in tension with the first plurality of sails at one or more points about a first end of the first plurality of sails and to rotate with the first plurality of sails under the influence of the wind while the first stationary support remains stationary. For example, the platform may include or correspond to platform 542 of FIG. 5C. The mastless vertical axis wind turbine may include a central connector configured to couple the first plurality of sails to the second stationary support. The central connector is configured to, during operation of the mastless vertical axis wind turbine, be in tension with the first plurality of sails about the vertical axis and a second end of the first plurality of sails. For example, the central connector may include or correspond to connecting point 550 of FIG. 5C.

At 704, the method 700 includes engaging a second plurality of sails to the central connector of the mastless vertical axis wind turbine. The second plurality of sails have respective first ends that are coupled together and second ends that are each coupled to one or more stationary surfaces. The second plurality of sails are configured to, during operation of the mastless vertical axis wind turbine, remain stationary while the first plurality of sails rotate under the influence of the wind. For example, the second plurality of sails may include or correspond to second sails 560 of FIG. 5C.

In some implementations, the second plurality of sails includes four sails that are disposed such that each sail of the second plurality of sails is disposed at a respective position that is radially separated by approximately 90 degrees from positions of adjacent sails of the second plurality of sails. For example, second sails 560 may include four sails that may be disposed and positioned as shown in FIG. 5B. Additionally or alternatively, each of the second plurality of sails may be disposed such that a first axis that extends from a first side of the second end of the sail through a second side of the second end is oblique to a second axis that extends from the center of the first plurality of sails through the second side of the second end. For example, the first axis may include or correspond to first axis 570 of FIG. 5B and the second axis may include or correspond to second axis 572 of FIG. 5B.

It is noted that other types of devices and functionality may be provided according to aspects of the present disclosure and discussion of specific devices and functionality herein have been provided for purposes of illustration, rather than by way of limitation. It is noted that the operations of method 600 of FIG. 6 and method 700 of FIG. 7 may be performed in any order, or one or more operations may be added or omitted. Additionally, one or more operations of one method may be included in another method, such as one or more of the operations of method 600 of FIG. 6 being included in method 700 of FIG. 7, or vice versa. It is also noted that method 600 of FIG. 6 and method 700 of FIG. 7 may also include other functionality or operations consistent with the description of the operations of turbine 100 of FIGS. 1A-E, stand 140 of FIG. 2, stand 140 of FIGS. 3A-H, watercraft sail turbine 400 of FIG. 4, or turbine 500 of FIG. 5.

Various modifications to the implementations described in this disclosure may be readily apparent to those skilled in the art, and the generic principles defined herein may be applied to some other implementations without departing from the scope of this disclosure. Thus, the claims are not intended to be limited to the implementations shown herein, but are to be accorded the widest scope consistent with this disclosure, the principles and the novel features disclosed herein.

Although the aspects of the present disclosure and their advantages have been described in detail, it should be understood that various changes, substitutions and alterations can be made herein without departing from the scope of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

The invention claimed is:

1. A mastless vertical axis wind turbine, the mastless vertical axis wind turbine comprising:
   a first plurality of sails configured to, during operation of the mastless vertical axis wind turbine, rotate about a vertical axis under the influence of wind;
   a platform coupled to the first plurality of sails and configured to, during operation of the mastless vertical axis wind turbine, be in tension with the first plurality of sails at one or more points about a particular end of the first plurality of sails; and
   a second plurality of sails having respective first ends that are coupled together and second ends that are each coupled to one or more stationary surfaces, the second plurality of sails configured to remain stationary as the first plurality of sails rotate under the influence of the wind.

2. The mastless vertical axis wind turbine of claim 1, where:
   the second plurality of sails includes four sails; and
   each sail of the second plurality of sails is disposed at a respective position that is radially separated by approximately 90 degrees from positions of adjacent sails of the second plurality of sails.

3. The mastless vertical axis wind turbine of claim 1, where a cross-sectional area of each of the second plurality of sails is greater than a cross-sectional area of each of the first plurality of sails.

4. The mastless vertical axis wind turbine of claim 1, where, for each sail of the second plurality of sails, the sail is disposed such that a first axis that extends from a first side of the second end of the sail through a second side of the second end is oblique to a second axis that extends from the center of the first plurality of sails through the second side of the second end.

5. The mastless vertical axis wind turbine of claim 4, where:
   the second plurality of sails includes four sails; and
   for each sail of the second plurality of sails, an acute angle formed by an intersection of the first axis and the second axis is approximately 30 degrees.

6. The mastless vertical axis wind turbine of claim 1, further comprising:
   an external frame coupled to the first plurality of sails and the second plurality of sails, the external frame configured to, during operation of the mastless vertical axis wind turbine, be in tension with the first plurality of sails at one or more points about an opposite particular end of the first plurality of sails, where the external frame comprises:
      a coupling mechanism configured to, during operation of the mastless vertical axis wind turbine, connect the external frame to the first plurality of sails and the second plurality of sails such that the first plurality of sails rotate about the vertical axis while the second plurality of sails and the external frame remain stationary.

7. The mastless vertical axis wind turbine of claim 6, where the external frame further comprises a plurality of legs disposed such that each of the plurality of legs converge above the first plurality of sails and the second plurality of sails at a central point about the vertical axis and such that each of the plurality of legs extend beyond a path swept by the first plurality of sails during operation of the mastless vertical axis wind turbine.

8. The mastless vertical axis wind turbine of claim 7, where the plurality of legs comprises three legs that are disposed such that each of the legs extends to a position that is radially separated from positions to which the other two legs extend by approximately 120 degrees.

9. The mastless vertical axis wind turbine of claim 1, further comprising a generator in communication with the platform and configured to generate energy in response to rotation of the platform.

10. The mastless vertical axis wind turbine of claim 9, further comprising one or more energy storage units in communication with the generator.

11. A method for generating energy utilizing a mastless vertical axis wind turbine, the method comprising:
   configuring a first plurality of sails that during operation of the mastless vertical axis wind turbine rotate about a vertical axis under the influence of wind;
   supporting the first plurality of sails utilizing a platform that during operation of the mastless vertical axis wind turbine is connected to and in tension with the first plurality of sails at one or more points about a particular end of first the plurality of the sails; and
   configuring a second plurality of sails that during operation of the mastless vertical axis wind turbine remain stationary as the first plurality of sails rotate under the influence of the wind, the second plurality of sails having respective first ends that are coupled together and second ends that are each coupled to one or more stationary surfaces.

12. The method of claim 11, where the second plurality of sails includes four sails that are disposed such that each sail of the second plurality of sails is disposed at a respective position that is radially separated by approximately 90 degrees from positions of adjacent sails of the second plurality of sails.

13. The method of claim 11, where configuring the second plurality of sails includes disposing each of the second plurality of sails such that a first axis that extends from a first side of the second end of the sail through a second side of the second end is oblique to a second axis that extends from the center of the first plurality of sails through the second side of the second end.

14. The method of claim 11, further comprising supporting the first plurality of sails and the second plurality of sails utilizing an external frame that during operation of the mastless vertical axis wind turbine is coupled to and in tension with the first plurality of sails at one or more points about an opposite particular end of the first plurality of sails, where the external frame comprises a coupling mechanism that during operation of the mastless vertical axis wind turbine connects the external frame to the first plurality of sails and the second plurality of sails such that the first plurality of sails rotate about the vertical axis while the second plurality of sails and the external frame remain stationary.

15. The method of claim 11, where the mastless vertical axis wind turbine further comprises a generator, in communication with the platform, that generates energy in response to rotation of the platform.

16. A mastless vertical axis wind turbine, the mastless vertical axis wind turbine comprising:
   a first plurality of sails configured to, during operation of the mastless vertical axis wind turbine, rotate about a vertical axis under the influence of wind;
   a platform configured to couple the first plurality of sails to a first stationary support, the platform configured to, during operation of the mastless vertical axis wind turbine, be in tension with the first plurality of sails at one or more points about a first end of the first plurality of sails and to rotate with the first plurality of sails under the influence of the wind, where the first stationary support is configured to remain stationary as the first plurality of sails rotate under the influence of the wind;
   a second plurality of sails having respective first ends that are coupled together and second ends that are each coupled to one or more stationary surfaces, the second plurality of sails configured to remain stationary while the first plurality of sails rotate under the influence of the wind; and
   a central connector configured to couple the first plurality of sails and the second plurality of sails to a second stationary support, the central connector configured to, during operation of the mastless vertical axis wind turbine, be in tension with the first plurality of sails about the vertical axis and a second end of the first plurality of sails.

17. The mastless vertical axis wind turbine of claim 16, where:
   the second plurality of sails includes four sails; and
   each sail of the second plurality of sails is disposed at a respective position that is radially separated by approximately 90 degrees from positions of adjacent sails of the second plurality of sails.

18. The mastless vertical axis wind turbine of claim 16, where a cross-sectional area of each of the second plurality of sails is greater than a cross-sectional area of each of the first plurality of sails.

19. The mastless vertical axis wind turbine of claim 16, where, for each sail of the second plurality of sails, the sail is disposed such that a first axis that extends from a first side of the second end of the sail through a second side of the second end is oblique to a second axis that extends from the center of the first plurality of sails through the second side of the second end.

20. The mastless vertical axis wind turbine of claim 19, where:
   the second plurality of sails includes four sails; and
   for each sail of the second plurality of sails, an acute angle formed by an intersection of the first axis and the second axis is approximately 30 degrees.

21. The mastless vertical axis wind turbine of claim 16, where the platform comprises a plurality of spokes, where each spoke of the plurality of spokes corresponds to a sail of the first plurality of sails, and where each spoke of the plurality of spokes extends along a length of the first end of a corresponding sail of the first plurality of sails.

22. The mastless vertical axis wind turbine of claim 21, where the plurality of spokes comprises six spokes in a hexagonal configuration, and where the first plurality of sails comprises six sails.

23. The mastless vertical axis wind turbine of claim 16, further comprising:
   a generator in communication with the platform and centrally aligned with the vertical axis, the generator configured to generate energy in response to rotation of the platform; and one or more energy storage units in communication with the generator.

24. A method for generating energy utilizing a mastless vertical axis wind turbine, the method comprising:
- engaging the mastless vertical axis wind turbine with a first stationary support and a second stationary support, where the mastless vertical axis wind turbine comprises:
  - a first plurality of sails that rotate about a vertical axis under the influence of wind;
  - a platform configured to couple the first plurality of sails to the first stationary support, the platform configured to, during operation of the mastless vertical axis wind turbine, be in tension with the first plurality of sails at one or more points about a first end of the first plurality of sails and to rotate with the first plurality of sails under the influence of the wind while the first stationary support remains stationary; and
  - a central connector configured to couple the first plurality of sails to the second stationary support, the central connector configured to, during operation of the mastless vertical axis wind turbine, be in tension with the first plurality of sails about the vertical axis and a second end of the first plurality of sails; and
- engaging a second plurality of sails to the central connector of the mastless vertical axis wind turbine, the second plurality of sails having respective first ends that are coupled together and second ends that are each coupled to one or more stationary surfaces, the second plurality of sails configured to, during operation of the mastless vertical axis wind turbine, remain stationary while the first plurality of sails rotate under the influence of the wind.

25. The method of claim 24, where the second plurality of sails includes four sails that are disposed such that each sail of the second plurality of sails is disposed at a respective position that is radially separated by approximately 90 degrees from positions of adjacent sails of the second plurality of sails.

26. The method of claim 24, where each of the second plurality of sails are disposed such that a first axis that extends from a first side of the second end of the sail through a second side of the second end is oblique to a second axis that extends from the center of the first plurality of sails through the second side of the second end.

* * * * *